US012744648B2

(12) United States Patent
Wang et al.

(10) Patent No.: US 12,744,648 B2
(45) Date of Patent: Sep. 22, 2026

(54) METHODS AND APPARATUSES FOR REPORTING CONFIGURED GRANT RESOURCE USAGE STATUS

(71) Applicant: SHARP KABUSHIKI KAISHA, Sakai City (JP)

(72) Inventors: Hai-Han Wang, Taipei (TW); Chia-Hung Wei, Taipei (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 289 days.

(21) Appl. No.: 18/444,606

(22) Filed: Feb. 16, 2024

(65) Prior Publication Data

US 2024/0283615 A1 Aug. 22, 2024

Related U.S. Application Data

(60) Provisional application No. 63/446,700, filed on Feb. 17, 2023.

(51) Int. Cl.

| | |
|---|---|
| ***H04L 5/00*** | (2006.01) |
| ***H04L 1/1829*** | (2023.01) |
| ***H04W 72/0446*** | (2023.01) |
| ***H04W 72/21*** | (2023.01) |

(52) U.S. Cl.
CPC .......... *H04L 5/0055* (2013.01); *H04L 1/1854* (2013.01); *H04W 72/0446* (2013.01); *H04W 72/21* (2023.01)

(58) Field of Classification Search
CPC . H04W 72/23; H04W 72/21; H04W 72/1268; H04W 72/0446; H04L 1/1854; H04L 5/0055
See application file for complete search history.

(56) References Cited

U.S. PATENT DOCUMENTS

| | | | | |
|---|---|---|---|---|
| 2024/0172220 | A1* | 5/2024 | Hu | H04W 72/21 |
| 2024/0276497 | A1* | 8/2024 | Xu | H04W 72/115 |
| 2025/0287423 | A1* | 9/2025 | Wang | H04L 5/0044 |
| 2025/0358814 | A1* | 11/2025 | Nagano | H04W 72/1268 |

* cited by examiner

*Primary Examiner* — Congvan Tran
(74) *Attorney, Agent, or Firm* — ScienBiziP, P.C.

(57) ABSTRACT

Methods and apparatuses for reporting Configured Grant (CG) resource usage status are provided. The method includes determining a plurality of Physical Uplink Shared Channel (PUSCH) occasions within a CG periodicity based on a CG configuration; and transmitting a respective Unused PUSCH Indicator (UPI) in each PUSCH occasion in the plurality of PUSCH occasions that is used by the UE within the CG periodicity, each UPI indicating a set of one or more PUSCH occasions in the plurality of PUSCH occasions that is not used by the UE within the CG periodicity, where a bit length of each UPI is determined based on a total number of the plurality PUSCH occasions within the CG periodicity.

14 Claims, 14 Drawing Sheets

METHODS AND APPARATUSES FOR REPORTING CONFIGURED GRANT RESOURCE USAGE STATUS

CROSS-REFERENCE TO RELATED APPLICATION(S)

The present disclosure claims the benefit of and priority to U.S. Provisional Patent Application Ser. No. 63/446,700, filed on Feb. 17, 2023, entitled "CONFIGURED GRANT ENHANCEMENTS FOR XR SERVICES," the content of which is hereby incorporated herein fully by reference into the present disclosure for all purposes.

FIELD

The present disclosure is related to wireless communication and, more specifically, to methods and apparatuses for reporting Configured Grant (CG) resource usage status.

BACKGROUND

Various efforts have been made to improve different aspects of wireless communication for cellular wireless communication systems, such as 5th Generation (5G) New Radio (NR), by improving data rate, latency, reliability, and mobility. The 5G NR system is designed to provide flexibility and configurability to optimize network services and types, accommodating various use cases, such as enhanced Mobile Broadband (eMBB), massive Machine-Type Communication (mMTC), and Ultra-Reliable and Low-Latency Communication (URLLC). As the demand for radio access continues to increase, however, there exists a need for further improvements in the art.

SUMMARY

The present disclosure is related to methods and apparatuses for reporting Configured Grant (CG) resource usage status.

According to a first aspect of the present disclosure, a method performed by a User Equipment (UE) for reporting Configured Grant (CG) resource usage status is provided. The method includes determining a plurality of Physical Uplink Shared Channel (PUSCH) occasions within a CG periodicity based on a CG configuration; and transmitting a respective Unused PUSCH Indicator (UPI) in each PUSCH occasion in the plurality of PUSCH occasions that is used by the UE within the CG periodicity, each UPI indicating a set of one or more PUSCH occasions in the plurality of PUSCH occasions that is not used by the UE within the CG periodicity, where a bit length of each UPI is determined based on a total number of the plurality PUSCH occasions within the CG periodicity.

In some implementations of the first aspect of the present disclosure, each UPI includes a bitmap, and each bit in the bitmap corresponds to a respective PUSCH occasion of the plurality of PUSCH occasions within the CG periodicity.

In some implementations of the first aspect of the present disclosure, a total number of bits in the bitmap is equal to the total number of the plurality of PUSCH occasions within the CG periodicity.

In some implementations of the first aspect of the present disclosure, each UPI further indicates a second set of one or more PUSCH occasions in the plurality of PUSCH occasions that is scheduled to be used by the UE within the CG periodicity.

In some implementations of the first aspect of the present disclosure, the plurality of PUSCH occasions within the CG periodicity includes a first PUSCH occasion, a second PUSCH occasion, and a third PUSCH occasion. Transmitting the respective UPI in each PUSCH occasion of the plurality of PUSCH occasions that is used by the UE within the CG periodicity includes transmitting a first UPI in the first PUSCH occasion, the first UPI indicating that the third PUSCH occasion is scheduled to be used; and transmitting a second UPI in the second PUSCH occasion, which occurs after the first PUSCH occasion, the second UPI changing a usage status of the third PUSCH occasion by indicating that the third PUSCH is unused.

In some implementations of the first aspect of the present disclosure, transmitting the respective UPI includes transmitting each UPI via Uplink Control Information (UCI).

In some implementations of the first aspect of the present disclosure, the UCI includes Hybrid Automatic Repeat Request-Acknowledgment (HARQ-ACK) information, and a transmission priority of the HARQ-ACK information is configured to be greater than a transmission priority of each UPI.

According to a second aspect of the present disclosure, a User Equipment (UE) for reporting Configured Grant (CG) resource usage status is provided. The UE includes at least one processor and at least one memory coupled to the at least one processor. The at least one memory stores one or more computer-executable instructions that, when executed by the at least one processor, cause the UE to determine a plurality of Physical Uplink Shared Channel (PUSCH) occasions within a CG periodicity based on a CG configuration; and transmit a respective Unused PUSCH Indicator (UPI) in each PUSCH occasion in the plurality of PUSCH occasions that is used by the UE within the CG periodicity, each UPI indicating a set of one or more PUSCH occasions in the plurality of PUSCH occasions that is not used by the UE within the CG periodicity, where a bit length of each UPI is determined based on a total number of the plurality PUSCH occasions within the CG periodicity.

In some implementations of the second aspect of the present disclosure, each UPI includes a bitmap, and each bit in the bitmap corresponds to a respective PUSCH occasion of the plurality of PUSCH occasions within the CG periodicity.

In some implementations of the second aspect of the present disclosure, a total number of bits in the bitmap is equal to the total number of the plurality of PUSCH occasions within the CG periodicity.

In some implementations of the second aspect of the present disclosure, each UPI further indicates a second set of one or more PUSCH occasions in the plurality of PUSCH occasions that is scheduled to be used by the UE within the CG periodicity.

In some implementations of the second aspect of the present disclosure, the plurality of PUSCH occasions within the CG periodicity includes a first PUSCH occasion, a second PUSCH occasion, and a third PUSCH occasion. Transmitting the respective UPI in each PUSCH occasion of the plurality of PUSCH occasions that is used by the UE within the CG periodicity includes transmitting a first UPI in the first PUSCH occasion, the first UPI indicating that the third PUSCH occasion is scheduled to be used; and transmitting a second UPI in the second PUSCH occasion, which occurs after the first PUSCH occasion, the second UPI changing a usage status of the third PUSCH occasion by indicating that the third PUSCH is unused.

In some implementations of the second aspect of the present disclosure, transmitting the respective UPI includes transmitting each UPI via Uplink Control Information (UCI).

In some implementations of the second aspect of the present disclosure, the UCI includes Hybrid Automatic Repeat Request-Acknowledgment (HARQ-ACK) information, and a transmission priority of the HARQ-ACK information is configured to be greater than a transmission priority of each UPI.

BRIEF DESCRIPTION OF THE DRAWINGS

Aspects of the present disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
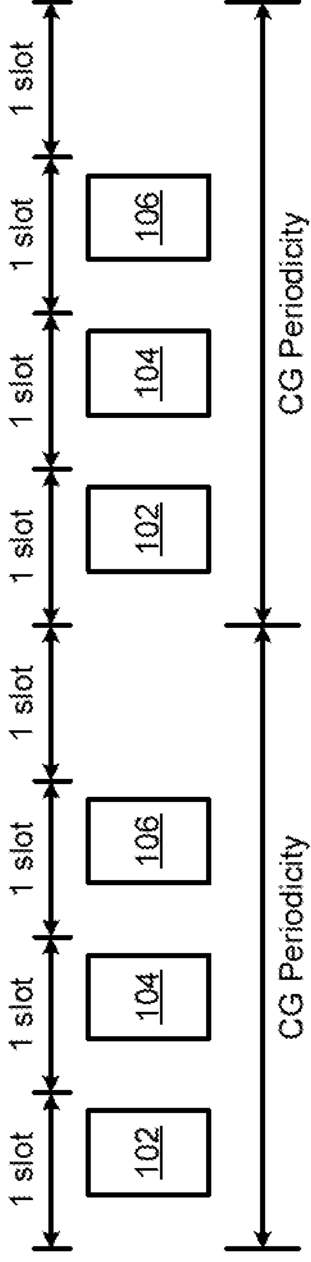
FIG. 1 is a diagram illustrating multiple PUSCH occasions within a CG periodicity, according to an example implementation of the present disclosure.

Some of the abbreviations used in this disclosure include:

| Abbreviation | Full name |
|---|---|
| 3GPP | 3$^{rd}$ Generation Partnership Project |
| 5G | 5$^{th}$ Generation |
| 5GC | 5G Core |
| ACK | Acknowledgement |
| A-CSI | Aperiodic Channel State Information |
| AL | Aggregation Level |
| AN-PDB | Access Network Packet Delay Budget |
| AS | Access Stratum |
| ASN.1 | Abstract Syntax Notation One |
| BA | Bandwidth Adaptation |
| BFRQ | Beam Failure Recovery Request |
| BS | Base Station |
| BSR | Buffer Status Report |
| BWP | Bandwidth Part |
| C-RNTI | Cell Radio Network Temporary Identifier |
| CA | Carrier Aggregation |
| CAG | Closed Access Group |
| CBGTI | Code Block Group Transmission Information |
| CCE | Control Channel Element |
| CG | Configured Grant |
| CI | Cancellation Indication |
| CJT | Coherent Joint Transmission |
| CN | Core Network |
| CN-PDB | Core Network Packet Delay Budget |
| CORESET | Control Resource Set |
| CRC | Cyclic Redundancy Check |
| CSI | Channel State Information |
| CSI-RS | Channel State Information Reference Signal |
| CS-RNTI | Configured Scheduling Radio Network Temporary Identifier |
| CSS | Common Search Space |
| CU | Central Unit |
| DAPS | Dual Active Protocol Stack |
| DC | Dual Connectivity |
| DCI | Downlink Control Information |
| DG | Dynamic Grant |
| DI | Delay Information |
| DL | Downlink |
| DL-SCH | Downlink Shared Channel |
| DMRS | Demodulation Reference Signal |
| DR | Delay Report |
| DRB | Data Radio Bearer |
| DTCH | Dedicated Traffic Channel |
| DU | Distributed Unit |
| ETSI | European Telecommunications Standards Institute |
| E-UTRA | Evolved Universal Terrestrial Radio Access |
| EN-DC | E-UTRA NR Dual Connectivity |
| EPC | Evolved Packet Core |
| eMBB | Enhanced Mobile BroadBand |
| eMTC | Enhanced Machine Type Communication |
| eNB | Evolved Node B |
| FDD | Frequency Division Duplexing |
| FR | Frequency Range |
| FR1 | Frequency Range 1 |
| FR2 | Frequency Range 2 |
| GEO | Geostationary Equatorial Orbit |
| gNB | Next Generation Node B |
| GNSS | Global Navigation Satellite System |
| GW | Gateway |
| HARQ | Hybrid Automatic Repeat Request |
| HARQ-ACK | Hybrid Automatic Repeat Request Acknowledgement |
| HO | Handover |
| FDD | Frequency Division Duplexing |
| FR | Frequency Range |
| IAB | Integrated Access and Backhaul |
| ID | Identity |
| IE | Information Element |
| IoT | Internet of Things |
| IIoT | Industrial Internet of Things |
| ITS | Intelligent Transportation System |
| ITU | International Telecommunication Union |
| L1 | Layer 1 |
| L2 | Layer 2 |
| L3 | Layer 3 |

-continued

| Abbreviation | Full name |
|---|---|
| LAN | Local Area Network |
| LCG | Logical Channel Group |
| LCH | Logical Channel |
| LCID | Logical Channel Identity |
| LCP | Logical Channel Prioritization |
| LEO | Low Earth Orbit |
| LRR | Link Recovery Request |
| LTE | Long Term Evolution |
| MAC | Medium Access Control |
| MAC CE | MAC Control Element |
| MCG | Master Cell Group |
| MCS | Modulation and Coding Scheme |
| MCS-C- | Modulation Coding Scheme Cell Radio Network |
| RNTI | Temporary Identifier |
| MIB | Master Information Block |
| MIMO | Multi-Input Multi-Output |
| mMTC | Massive Machine Type Communications |
| MN | Master Node |
| Msg1 | Message 1 |
| Msg2 | Message 2 |
| Msg3 | Message 3 |
| Msg4 | Message 4 |
| MTC | Machine Type Communication |
| NACK | Negative Acknowledgement |
| NAS | Non-Access Stratum |
| NB-IoT | Narrow Band Internet of Things |
| NDI | New Data Indicator |
| NPN | Non-Public Network |
| NR | New Radio |
| NR-U | NR Unlicensed |
| NTN | Non-Terrestrial Network |
| NUL | Normal Uplink |
| OFDM | Orthogonal Frequency-Division Multiplexing |
| PBCH | Physical Broadcast Channel |
| PCell | Primary Cell |
| PCI | Physical Cell Identity |
| PDB | Packet Delay Budget |
| PDCCH | Physical Downlink Control Channel |
| PDCP | Packet Data Convergence Protocol |
| PDSCH | Physical Downlink Shared Channel |
| PDU | Protocol Data Unit |
| PHY | Physical |
| PLMN | Public Land Mobile Network |
| PNI-NPN | Public Network Integrated Non-Public Network |
| PRACH | Physical Random Access Channel |
| PRB | Physical Resource Block |
| PSDB | PDU Set Delay Budget |
| PTRS | Phase Tracking Reference Signal |
| PUCCH | Physical Uplink Control Channel |
| PUSCH | Physical Uplink Shared Channel |
| QoS | Quality of Service |
| RA | Random Access |
| RA-RNTI | Random Access Radio Network Temporary Identifier |
| RACH | Random Access Channel |
| RAN | Radio Access Network |
| RAPID | Random Access Preamble Identifier |
| RAR | Random Access Response |
| RAT | Radio Access Technology |
| RF | Radio Frequency |
| RLC | Radio Link Control |
| RS | Reference Signal |
| RLF | Radio Link Failure |
| RSTD | Reference Signal Time Difference Measurement |
| RNTI | Radio Network Temporary Identifier |
| RO | RACH Occasion |
| RRC | Radio Resource Control |
| RS | Reference Signal |
| RSRP | Reference Signal Received Power |
| RSRQ | Reference Signal Receiving Quality |
| SCell | Secondary Cell |
| SCG | Secondary Cell Group |
| SDT | Small Data Transmission |
| SDU | Service Data Unit |
| SFI | Slot Format Indicator |
| SFN | System Frame Number |
| SI | System Information |
| SIB | System Information Block |

-continued

| Abbreviation | Full name |
|---|---|
| SIB1 | System Information Block |
| SL | Sidelink |
| SLIV | Start and Length Indicator Value |
| SN | Secondary Node |
| SNPN | Stand-alone Non-Public Network |
| SpCell | Special Cell |
| SR | Scheduling Request |
| SRB | Signaling Radio Bearer |
| SRS | Sounding Reference Signal |
| SSB | Synchronization Signal Block |
| subPDU | Sub Protocol Data Unit |
| SUL | Supplementary Uplink |
| TA | Timing Advance |
| TAG | Timing Advance Group |
| TAT | Time Alignment Timer |
| TB | Transport Block |
| TBS | Transport Block Size |
| TCI | Transmission Configuration Indication |
| TDD | Time Division Duplexing |
| TDRA | Time Domain Resource Allocation |
| TN | Terrestrial Network |
| TRP | Transmission Reception Point |
| TRS | Tracking Reference Signal |
| TS | Technical Specification |
| TX | Transmission |
| UCI | Uplink Control Information |
| UE | User Equipment |
| UL | Uplink |
| UL-CG | Uplink-Configured Grant |
| UL-SCH | Uplink Shared Channel |
| UPF | User Plane Function |
| UPI | Unused Physical Uplink Shared Channel Indication |
| URLLC | Ultra-Reliable and Low-Latency Communications |
| USIM | Universal Subscriber Identity Module |
| USS | UE-specific Search Space |
| V2X | Vehicle-to-Everything |
| VSAT | Very Small Aperture Terminal |
| XR | Extended Reality |

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For consistency and ease of understanding, like features may be identified (although, in some examples, not illustrated) by the same numerals in the drawings. However, the features in different implementations may be different in other respects and shall not be narrowly confined to what is illustrated in the drawings.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series, and the equivalent.

The expression "at least one of A, B and C" or "at least one of the following: A, B and C" means "only A, or only B, or only C, or any combination of A, B and C." The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details, such as functional entities, techniques, protocols, and standards, are set forth for providing an understanding of the disclosed technology. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer executable instructions stored on a computer-readable medium, such as memory or other type of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or one or more Digital Signal Processor (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally UL resources to at least one UE within its radio coverage for DL and optionally UL packet transmissions. The BS may communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed above, the frame structure for NR supports flexible configurations for accommodating various next generation (e.g., 5G) communication requirements, such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3GPP may serve as a baseline for an NR waveform. The scalable OFDM numerology, such as adaptive sub-carrier spacing, channel bandwidth, and Cyclic Prefix (CP), may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services.

Any two or more than two of the following paragraphs, (sub)-bullets, points, actions, behaviors, terms, or claims described in the present disclosure may be combined logically, reasonably, and properly to form a specific method.

Any sentence, paragraph, (sub)-bullet, point, action, behaviors, terms, or claims described in the present disclosure may be implemented independently and separately to form a specific method.

Dependency, e.g., "based on", "more specifically", "preferably", "in one embodiment", "in some implementations", etc., in the present disclosure is just one possible example which would not restrict the specific method.

"A and/or B" in the present disclosure may refer to either A or B, both A and B, or at least one of A and B.

The terms, definitions, and abbreviations included in the present disclosure are either sourced from existing documents (such as those from ETSI, ITU, or other sources) or newly created by experts from 3GPP whenever there was a need for precise vocabulary.

Examples of some selected terms in the present disclosure are provided as follows.

BWP: A subset of the total bandwidth of a cell may be referred to as a BWP. A Bandwidth Adaptation (BA) may be achieved by configuring the UE with one or more BWPs and indicating to the UE which BWP is currently active. To enable the BA on the PCell, the gNB may configure the UE with at least one UL BWP and/or at least one DL BWP. To enable the BA on an Scells (e.g., in a CA), the gNB may configure the UE with at least one DL BWP and at least one UL BWP. The initial BWP for the Pcell may be the BWP used for the initial access, while for Scells, the initial BWP may be the BWP configured for the UE to first operate upon an Scell activation. The UE may be configured with a first active UP BWP through an information element (IE), such as a firstActiveUplinkBWP IE. If the first active UL BWP is for an SpCell, the firstActiveUplinkBWP IE field may contain the ID of the UL BWP to be activated when the RRC (re-)configuration is performed. If the firstActiveUplinkBWP IE field is absent, the RRC (re-)configuration does not impose a BWP switch. If the first active UL BWP is for an Scell, the firstActiveUplinkBWP IE field may contain the ID of the UL BWP to be used upon a MAC-activation of an Scell.

Extended Reality (XR) and cloud gaming are considered important use cases and services for NR in Release 18 and beyond. XR and cloud gaming broadly refer to various types of augmented, virtual, and mixed environments, enabling human-to-machine and human-to-human communications through handheld and wearable UEs. These services present attractive use cases for future mobile systems, but they also pose challenges for NR that may need to be addressed. For example, many XR and cloud gaming use cases are characterized by quasi-periodic traffic (with possible jitter) requiring high data rates in the DL (such as video streams) combined with frequent UL interactions (e.g., pose/control updates) and/or UL video streams. In addition, both DL and UL traffic for these use cases may be characterized by relatively strict Packet Delay Budgets (PDBs). Therefore, there is a need to study and potentially specify solutions to better support such demanding services.

In the present disclosure, although the term "gNB" is used throughout the document, it should be understood that the term "gNB" can be replaced by any other type of BS.

General Aspects

SSB

An SSB is used by the UE for DL synchronization and to measure the signal strength of a cell. Multiple SSBs may be transmitted by a gNB, and each SSB may be transmitted via different beams. An SSB may carry an MIB including the configuration of CORESET 0 and search space 0, which are used for scheduling the SIB1. The SIB1 may carry configurations related to cell selection and initial access, such as PRACH resource configuration. The UE may evaluate the measured results based on the configurations in the SIB1 to determine whether to camp on the cell and perform initial access. During the initial access, the initial DL BWP include the PRBs that contain CORESET 0. The initial DL BWP may be used for receiving RACH procedure related DL messages, such as the RAR, Msg4, and/or other messages before a dedicated DL BWP is configured by gNB. The initial DL BWP may also be used for receiving system information and paging messages. Specifically, a Type-1 common search space may be configured by the SIB1 to be associated with CORESET 0 or a CORESET configured by an IE, such as the commonControlResourceSet IE, for receiving DCI that schedules the RAR, the Msg4, and/or other messages before a dedicated DL BWP is configured by gNB. A Type-2 common search space may be configured by the SIB1 to be associated with CORESET 0 or a CORESET configured by the commonControlResourceSet IE for receiving DCI that schedules the paging messages. After the initial access, the initial DL BWP may be defined as the PRBs configured by the initial DL BWP configuration carried in the SIB1, if configured. Otherwise, the initial DL BWP may be the same as that used during the initial access. On the other hand, during and after the initial access, the initial UL BWP may include the PRBs that are configured by the initial UL BWP configuration, for example, carried by the SIB1.

PRACH

In Release 15, the PRACH resources for initial access may be configured by the SIB1. Specifically, the initial UL BWP configuration provided by the SIB1 may include a particular IE, such as the BWP-UplinkCommon IE, which includes the RACH-ConfigCommon IE used to configure the PRACH resources. For the RRC connected UEs, the PRACH resources may also be configured in other UL BWPs, and the UE may use the PRACH resources when the UL BWP with the PRACH resources is the active UL BWP.

RAR Reception

If a random access procedure is initiated, a UE may randomly select a PRACH preamble or may select the PRACH preamble based on an explicit configuration, or indication from the gNB. The UE may transmit the selected PRACH preamble in an RO, which may be the earliest RO available after the random access procedure is initiated, or may be the RO explicitly indicated, e.g., by a PRACH mask index. In response to the PRACH preamble transmission, the UE may monitor the PDCCH in an RAR window. Specifically, the UE may attempt to detect a DCI format 1_0 with CRC scrambled by an RA-RNTI associated with the RO in the RAR window. The RAR window may start at the first symbol of the earliest Type-1 CSS monitoring occasion, which may be at least one symbol after the last symbol of the RO where the PRACH preamble is transmitted.

If the UE detects the DCI format 1_0 with CRC scrambled by the RA-RNTI associated with the RO in which the PRACH preamble is transmitted, and receives a TB in a PDSCH scheduled by the DCI format 1_0 within the RAR window, the UE may pass the TB to the higher layers. The TB may include one or more RAR messages, each with an RAR MAC subPDU and a corresponding MAC subheader indicating a RAPID. The higher layers may parse the TB for a RAPID associated with the PRACH preamble transmission. If the higher layers identify the RAPID in the RAR messages, the higher layers may indicate a UL grant to the physical layer, referred to as an RAR UL grant.

PDCCH

In NR, a gNB may transmit DCI to a UE via a PDCCH using one or more CCEs in a CORESET. The configurations of a CORESET may include (1) the configuration of the PRBs of which the frequency domain resource is used for the CORESET and/or (2) the configuration of the number of OFDM symbols defining the time duration of the CORESET. One or more search spaces may be associated with a CORESET. One occasion of the CORESET may be referred to as a monitoring occasion. The configurations of a search space may include the configuration of the periodicity and time offset of the search space, as well as the configuration of the duration of the search space (e.g., the consecutive number of slots in which one or more monitoring occasions exist). If the duration is configured as one, there is only one slot in which the monitoring occasion(s) exists in each period. The configurations of a search space may also include the configuration of the type of the search space (e.g., USS or CSS) and the DCI format(s) that are monitored within the search space. Additionally, the configurations of a search space may include the number of PDCCH candidates per Aggregation Level (AL). It should be noted that a search space may also be referred to as a search space set. Once configured with the CORESET(s) and the search space(s), the UE may attempt to decode the PDCCH candidates based on the configurations, a process that may also be referred to as PDCCH monitoring.

DCI Formats Monitored in a Search Space

Possible combinations of the DCI formats monitored in a USS may include {DCI format 0_0, DCI format 1_0}, {DCI format 0_1, DCI format 1_1}, {DCI format 0_2, DCI format 1_2}, and {DCI format 0_1, DCI format 1_1, DCI format 0_2, DCI format 1_2}. Notably, DCI formats 0_0, 0_1, and 0_2 are for scheduling PUSCH, while DCI formats 1_0, 1_1, and 1_2 are for scheduling PDSCH. In a USS, the CRC of a DCI format may be scrambled by a C-RNTI, a CS-RNTI, or an MCS-C-RNTI. If the CRC of a DCI format 0_0, 0_1, or 0_2 is scrambled by a CS-RNTI, the PUSCH transmission scheduled by this DCI format is a retransmission of a CG PUSCH if the NDI field of the DCI format is set to 1. In a Type-3 CSS, a UE may be configured to monitor DCI format 0_0 and 1_0, and may also be configured to monitor DCI format 2_X, e.g., DCI format 2_0, DCI format 2_1, DCI format 2_2, DCI format 2_3, and DCI format 2_4, in the Type-3 CSS.

DCI Size Budget

Depending on the configurations related to the DCI fields of the DCI formats, different DCI formats may have different sizes. As separate decoding attempts are required to decode DCI formats with different sizes, a DCI size budget is defined to maintain reasonable complexity for the PDCCH monitoring. The DCI size budget may be defined as follows: the total number of different DCI payload sizes configured to be monitored should not exceed 4 for a cell, and the total number of different DCI payload sizes with a C-RNTI configured to be monitored should not exceed 3 for the cell. To meet the DCI size budget, a procedure of DCI size alignment may be performed to align the DCI sizes of some DCI formats for the cell.

Physical Layer Priority

NR Release 16 introduces two physical layer priorities: "high priority" (also known as priority index 1, p1) and "low priority" (also known as priority index 0, p0). The physical layer priority of a PUCCH/PUSCH may be assigned by the network via RRC signaling or an LI message (e.g., via a priority indicator in the DCI format 0_1, 1_1, 0_2, or 1_2). A PUCCH/PUSCH associated with the high priority may also be referred to as a high priority PUCCH/PUSCH, and a PUCCH/PUSCH associated with the low priority may also be referred to as a low priority PUCCH/PUSCH. A PUCCH for the HARQ-ACK may be associated with the high priority if the scheduling DCI for the corresponding PDSCH indicates the high priority, and the PUCCH for the HARQ-ACK may be associated with the low priority if the scheduling DCI for the corresponding PDSCH indicates the low priority. A PUCCH for SR or LRR may be associated with the high priority if and IE, such as the phy-PriorityIndex-r16 IE, of the SR resource configuration indicates p1, while the PUCCH for SR or LRR may be associated with the low priority if the phy-Priority Index-r16 IE of the SR resource configuration indicates p0.

Configured Grant

In NR, a UE in RRC_CONNECTED state may be provided with one or more Configured Grants (CG). The CG may be a Type-1 CG or a Type-2 CG. For a Type-1 CG, the UE may directly use the CG for UL transmissions after receiving the CG configuration. For a Type-2 CG, the UE may not directly use the CG for UL transmissions after receiving the CG configuration. To use the CG for a UL transmission, the UE needs to receive activation DCI which activates the CG. Specifically, the activation DCI may include a DCI format 0_0, DCI format 0_1, or DCI format 0_2 with CRC scrambled by a CS-RNTI, and the NDI field of the DCI format may be set to 0. A CG configuration may include one or more of the following configurations: time domain symbol allocation, frequency resource allocation, DMRS configuration, Modulation and Coding Scheme (MCS), periodicity, the number of repetitions, the number of HARQ processes, transform precoding.

PUSCH occasions configured by the CG occur periodically in the time domain with the configured periodicity. Within each period, there are PUSCH occasions in consecutive slots when the number of repetitions is greater than 1, and the number of consecutive slots is equal to the number of repetitions. That is, one slot contains one PUSCH occasion which may be used for one repetition, and each PUSCH occasion may have the same symbol allocation. The HARQ process ID for a PUSCH occasion may be determined based on the SFN and the slot number corresponding to the slot where the PUSCH occasion is located. Specifically, the HARQ process ID associated with the first symbol of a UL transmission may be determined by the following formula:

$$HARQ\ \text{Process}\ ID = [\text{floor}(\text{CURRENT\_symbol/periodicity})]\ \text{modulo}\ nrofHARQ\text{-}Processes,$$

where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot, respectively.

In NR Release 15, a CG configuration may be configured in a UL BWP of a UE. In NR Release 16, to better support a UE with more than one iIoT service, each iIoT service having different performance requirements (e.g., reliability and latency), up to 12 CG configurations may be configured in the UL BWP of the UE. To reduce the signaling overhead for releasing CG PUSCHs of multiple CG configurations, joint release of CG PUSCHs of multiple CG configurations via a single DCI may be supported.

HARQ-ACK Codebook

In a slot or a sub-slot, the UE may generate up to two HARQ-ACK codebooks. These two HARQ-ACK codebooks may be transmitted separately in separate PUCCHs, each PUCCH associated with its respective HARQ-ACK codebook.

More specifically, if a UE is provided with a specific list, e.g., the pdsch-HARQ-ACK-Codebook-List IE, the UE may be indicated by this list to generate one or two HARQ-ACK codebooks. If the UE is indicated to generate one HARQ-ACK codebook, the HARQ-ACK codebook is associated with a PUCCH of priority index 0, also referred to as a low priority PUCCH. If the UE is provided with the pdsch-HARQ-ACK-Codebook-List, the UE may only multiplex the HARQ-ACK information associated with the same (physical layer) priority index in the same HARQ-ACK codebook. If the UE is indicated to generate two HARQ-ACK codebooks:

- a first HARQ-ACK codebook is associated with a PUCCH of priority index 0 and a second HARQ-ACK codebook is associated with a PUCCH of priority index 1, also known as a high priority PUCCH.
- the UE is provided with the first and second HARQ-ACK codebooks for each of the following IEs {PUCCH-Config, UCI-OnPUSCH, PDSCH-codeBlockGroup Transmission} by the following IEs {PUCCHConfigurationList, UCI-OnPUSCH-List, PDSCH-CodeBlockGroupTransmission-List}, respectively, for use with the first and second HARQ-ACK codebooks, respectively.

The pdsch-HARQ-ACK-Codebook-List IE provides the types of the first and second HARQ-ACK codebooks. Each HARQ-ACK codebook may be configured as a semi-static HARQ-ACK codebook, also referred to as a Type-1 HARQ-ACK codebook, or as a dynamic HARQ-ACK codebook, referred to as a Type-2 HARQ-ACK codebook. The first PUCCH-Config is a PUCCH configuration used to configure the low priority PUCCH resources, and the second PUCCH-Config is a PUCCH configuration used to configure the high priority PUCCH resources. A sub-slot configuration may be included in a PUCCH-Config. Two 7-symbol sub-slots or seven 2-symbol sub-slots may be configured in a slot.

If a sub-slot configuration is included in the first PUCCH-Config, a low priority HARQ-ACK codebook may be transmitted in a low priority PUCCH in a sub-slot defined by the sub-slot configuration. If a sub-slot configuration is included in the second PUCCH-Config, a high priority HARQ-ACK codebook may be transmitted in a high priority PUCCH in a sub-slot defined by the sub-slot configuration. The priority of a HARQ-ACK corresponding to a PDSCH may be explicitly indicated by a field in the DCI format 1_1 or DCI format 1_2 scheduling the PDSCH. The priority of a HARQ-ACK corresponding to a PDSCH may be implicitly determined as low priority if the PDSCH is scheduled by a DCI format 1_0.

The UCI-OnPUSCH IE is used to configure the beta offsets and the scaling factors, which are used for determining the number of resource elements required for multiplexing the UCI in a PUSCH when the PUCCH carrying the UCI overlaps with the PUSCH. The beta offset used for determining the number of resource elements for multiplexing the UCI in a PUSCH may be further determined based on the beta offset indicator field in the DCI format 0_1 or DCI format 0_2 scheduling the PUSCH. The number of resource elements is equivalent to the number of coded modulation symbols of the UCI per layer, as these coded modulation symbols of the UCI will be mapped to the resource elements for each layer of the PUSCH transmission. The UCI may include the HARQ-ACK and the CSI, where the CSI may include two parts, such as the CSI part 1 and the CSI part 2.

In cases where the UL-SCH, e.g., at least one transport block, is multiplexed in a PUSCH, the number of coded modulation symbols per layer $Q'_{ACK}$ for multiplexing the HARQ-ACK information in the PUSCH may be calculated based on the following formula, which is dependent on the beta offset $$\beta_{offset}^{PUSCH}:$$

$$Q'_{ACK} = \min\left\{\left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil\right\}$$

where $O_{ACK}$ is the number of HARQ-ACK bits;

if $O_{ACK} \geq 360$, $L_{ACK}=11$; otherwise $L_{ACK}$ is the number of CRC bits for the HARQ-ACK;

$$\beta_{offset}^{PUSCH} = \beta_{offset}^{HARQ\text{-}ACK};$$

$C_{UL-SCH}$ is the number of code blocks for the UL-SCH of the PUSCH transmission;

if the DCI format scheduling the PUSCH transmission includes a CBGTI field indicating that the UE shall not transmit the r-th code block, $K_r=0$; otherwise, $K_r$ is the r-th code block size for the UL-SCH of the PUSCH transmission;

$M_{sc}^{PUSCH}$ is the scheduled bandwidth of the PUSCH transmission, expressed as a number of subcarriers;

$M_{sc}^{PT\text{-}RS}(l)$ is the number of subcarriers in OFDM symbol l that carries PTRS, in SC the PUSCH transmission;

$M_{sc}^{UCI}(l)$ is the number of resource elements that can be used for transmission of UCI in OFDM symbol l, for $l = 0, 1, 2, \ldots, N_{symb,all}^{PUSCH} - 1,$ in the PUSCH transmission and $N_{symb,all}^{PUSCH}$ is the total number of OFDM symbols of the PUSCH, including all OFDM symbols used for DMRS;

for any OFDM symbol that carries DMRS of the PUSCH, $M_{sc}^{UCI}(l) = 0;$ for any OFDM symbol that does not carry DMRS of the PUSCH, $M_{sc}^{UCI}(l) = M_{sc}^{PUSCH} - M_{sc}^{PT\text{-}RS}(l);$ $\alpha$ is configured by higher layer parameter scaling;

$l_0$ is the symbol index of the first OFDM symbol that does not carry DMRS of the PUSCH, after the first DMRS symbol(s), in the PUSCH transmission.

In cases where the UL-SCH is multiplexed in a PUSCH, the number of resource elements $Q'_{CSI-1}$ for multiplexing the CSI part 1 in a PUSCH may be determined as:

$$Q'_{CSI-1} = \min\left\{\left\lceil \frac{(O_{CSI-1} + L_{CSI-1}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil,\right.$$

-continued $$\left.\left\lceil \alpha \cdot \sum_{l=0}^{N_{symb,all}^{PUSCH}-1} M_{sc}^{UCI}(l) \right\rceil - Q'_{ACK}\right\}$$

where $O_{CSI-1}$ is the number of bits for the CSI part 1;

if $O_{CSI-1} \geq 360$, $L_{CSI-1}=11$; otherwise $L_{CSI-1}$ is the number of CRC bits for the CSI part 1;

$\beta_{offset}^{PUSCH} = \beta_{offset}^{CSI\text{-}part1};$ $C_{UL-SCH}$ is the number of code blocks for the UL-SCH of the PUSCH transmission;

if the DCI format scheduling the PUSCH transmission includes a CBGTI field indicating that the UE shall not transmit the r-th code block, $K_r=0$; otherwise, $K_r$ is the r-th code block size for the UL-SCH of the PUSCH transmission;

$M_{sc}^{PUSCH}$ is the scheduled bandwidth of the PUSCH transmission, expressed as a number of subcarriers;

$M_{sc}^{PT\text{-}RS}(l)$ is the number of subcarriers in OFDM symbol, that carries PTRS, in the PUSCH transmission;

$Q'_{ACK}$ is the number of coded modulation symbols per layer for the HARQ-ACK transmitted on the PUSCH if the number of the HARQ-ACK information bits is more than 2, and $$Q'_{ACK} = \sum_{l=0}^{N_{symb,all}^{PUSCH}-1} \overline{M}_{sc,rvd}^{ACK}(l)$$

if the number of the HARQ-ACK information bits is no more than 2 bits, where $\overline{M}_{sc,rvd}^{ACK}(l)$ is the number of reserved resource elements for a potential HARQ-ACK transmission in OFDM symbol l, for $l = 0, 1, 2, \ldots, N_{symb,all}^{PUSCH} - 1,$ in the PUSCH transmission;

$M_{sc}^{UCI}(l)$ is the number of resource elements that can be used for transmission of UCI in OFDM symbol l, for $$l=0,1,2,\ldots,N_{symb,all}^{PUSCH}-1,$$

in the PUSCH transmission and $$N_{symb,all}^{PUSCH}$$

is the total number of OFDM symbols of the PUSCH, including all OFDM symbols used for DMRS;

for any OFDM symbol that carries DMRS of the PUSCH, $$M_{sc}^{UCI}(l)=0;$$

for any OFDM symbol that does not carry DMRS of the PUSCH, $$M_{sc}^{UC}(l)=M_{sc}^{PUSCH}-M_{sc}^{PT\text{-}RS}(l);$$

α is configured by higher layer parameter scaling.

In cases where the UL-SCH is multiplexed in a PUSCH, the number of resource elements $$Q'_{CSI-2}$$

for multiplexing the CSI part 2 in a PUSCH may be determined as:

$$Q'_{CSI-2}=\min\left\{\left\lceil\frac{(O_{CSI-2}+L_{CSI-2})\cdot\beta_{offset}^{PUSCH}\cdot\sum_{l=0}^{N_{symb,all}^{PUSCH}-1}M_{sc}^{UCI}(l)}{\sum_{r=0}^{C_{UL-SCH}-1}K_r}\right\rceil,\left\lceil\alpha\cdot\sum_{l=0}^{N_{symb,all}^{PUSCH}-1}M_{sc}^{UCI}(l)\right\rceil-Q'_{ACK}-Q'_{CSI-1}\right\}$$

where $O_{CSI-2}$ is the number of bits for the CSI part 2;

if $O_{CSI-2}\geq 360$, $L_{CSI-2}=11$; otherwise $L_{CSI-2}$ is the number of CRC bits for the CSI part 2;

$$\beta_{offset}^{PUSCH}=\beta_{offset}^{CSI\text{-}part2};$$

$C_{UL-SCH}$ is the number of code blocks for the UL-SCH of the PUSCH transmission;

if the DCI format scheduling the PUSCH transmission includes a CBGTI field indicating that the UE shall not transmit the r-th code block, $K_r=0$; otherwise, $K_r$ is the r-th code block size for the UL-SCH of the PUSCH transmission;

$$M_{sc}^{PUSCH}$$

is the scheduled bandwidth of the PUSCH transmission, expressed as a number of subcarriers;

$$M_{sc}^{PT-RS}(l)$$

is the number of subcarriers in OFDM symbol l that carries PTRS, in the PUSCH transmission;

$Q'_{ACK}$ is the number of coded modulation symbols per layer for the HARQ-ACK transmitted on the PUSCH if the number of the HARQ-ACK information bits is more than 2, and $Q'_{ACK}=0$ if the number of the HARQ-ACK information bits is 1 or 2 bits;

$Q'_{CSI-1}$ is the number of coded modulation symbols per layer for the CSI part 1 transmitted on the PUSCH;

$$M_{sc}^{UCI}(l)$$

is the number of resource elements that can be used for transmission of UCI in OFDM symbol l, for $$l=0,1,2,\ldots,N_{symb,all}^{PUSCH}-1,$$

in the PUSCH transmission and $$N_{symb,all}^{PUSCH}$$

is the total number of OFDM symbols of the PUSCH, including all OFDM symbols used for DMRS;

for any OFDM symbol that carries DMRS of the PUSCH, $$M_{sc}^{UCI}(l)=0;$$

for any OFDM symbol that does not carry DMRS of the PUSCH, $$M_{sc}^{UCI}(l)=M_{sc}^{PUSCH}-M_{sc}^{PT\text{-}RS}(l);$$

α is configured by higher layer parameter scaling.

UCI Multiplexing in PUSCH

When a PUCCH of a certain priority overlaps with a PUSCH of the same certain priority, the UCI that was to be transmitted in the PUCCH may be multiplexed in the PUSCH. More specifically, the PUCCH may be used for multiplexing the UCI, among multiple overlapping PUCCHs. The PUCCH may be determined by a UCI multiplexing procedure applied to the multiple overlapping PUCCHs. If the multiplexed UCI in the PUCCH includes an SR, the SR may be dropped. In other words, the HARQ-ACK and the CSI may be multiplexed in the PUSCH, while the SR is not. When the PUCCH overlaps with multiple PUSCHs, the UE may multiplex the UCI, originally to be transmitted in the PUCCH, in one of the multiple PUSCHs. The UE may determine which PUSCH to use by considering the following priorities, where a PUSCH with a higher priority may be considered for multiplexing the UCI before a PUSCH with a lower priority:

First priority: A PUSCH with A-CSI, as long as it overlaps with the PUCCH.

Second priority: The earliest PUSCH slot(s) based on the start of the slot(s).

If multiple PUSCHs still overlap with the PUCCH in the earliest PUSCH slot(s), the following priorities are applied sequentially from high to low:

Third priority: Dynamic grant PUSCHs are prioritized over PUSCHs configured by a particular IE, such as the respective ConfiguredGrantConfig IE or semiPersistentOn-PUSCH IE.

Fourth priority: PUSCHs on a serving cell with a smaller serving cell index are prioritized over PUSCHs on a serving cell with a larger serving cell index.

Fifth priority: Earlier PUSCH transmissions are prioritized over later PUSCH transmissions.

Slot Format Indication

In NR, the slot format of a slot may be indicated by an RRC configuration, which may be referred to as a TDD configuration. Besides the RRC configuration, DCI may also be used to indicate the slot format of a slot. The RRC configuration may be configured via the SIB1, e.g., via a particular IE, such as the TDD-UL-DL-ConfigCommon IE, and optionally, via a dedicated RRC message (e.g., the TDD-UL-DL-ConfigDedicated IE). The TDD-UL-DL-ConfigCommon IE may configure a periodicity, the number of DL symbols, the number of UL symbols, and the number of flexible symbols within a period equal to the periodicity. The pattern of DL symbols, UL symbols, and flexible symbols may be repeated with this periodicity. The DL symbols within a period are located consecutively from the start of the period. The number of DL symbols may be configured via the nrofDownlinkSlots IE, which indicates the number of slots with all DL symbols, and the nrofDownlinkSymbols IE, which indicates the number of DL symbols in the slot after the last slot with all DL symbols.

The UL symbols within a period are located consecutively at the end of the period. The number of UL symbols is configured via a particular IE, such as the nrofUplinkSlots IE, which indicates the number of slots with all UL symbols at the end of the period, and the nrofUplinkSymbols IE, which indicates the number of UL symbols in the slot before the first slot with all UL symbols. If there are symbols in the period not indicated as either DL or UL symbols, they are defined as flexible symbols, located consecutively between the DL and UL symbols within the period.

If a UE is provided with the TDD-UL-DL-ConfigDedicated IE, the TDD-UL-DL-ConfigDedicated IE configures the slot formats of specific slots. These specific slots are explicitly indicated via the TDD-UL-DL-ConfigDedicated IE and define a subset of the slots with at least one flexible symbol configured via the TDD-UL-DL-ConfigCommon IE. In other words, the TDD-UL-DL-ConfigDedicated IE is used to further specify the directions of a subset of the flexible symbols configured via the TDD-UL-DL-ConfigCommon IE. A flexible symbol may be indicated as a DL symbol, a UL symbol, or a flexible symbol via the TDD-UL-DL-ConfigDedicated IE. Specifically, a specific slot may be indicated as a slot with all DL symbols, a slot with all UL symbols, or a slot with a number of DL symbols at the front of the slot and a number of UL symbols at the end of the slot. If there are symbols in the slot not indicated as either DL or UL symbols, these symbols are defined as flexible symbols.

The DL symbols, UL symbols, and flexible symbols configured via the TDD-UL-DL-ConfigCommon IE, and optionally via the TDD-UL-DL-ConfigDedicated IE, may also be referred to as semi-static DL symbols, semi-static UL symbols, and semi-static flexible symbols, respectively.

A DCI format 2_0 may be used to indicate the slot formats of a number of slots in one or more cells. The DCI format 2_0 is also referred to as a Slot Format Indicator (SFI). The UE may be configured with a Type-3 CSS in one cell, where the UE should monitor the DCI format 2_0. The DCI format 2_0 may include one or more SFI-index fields, each indicating the slot formats of one or more slots of a specific serving cell. The position of an SFI-index field in the DCI format 2_0 and the specific serving cell to which the SFI-index is applied may be preconfigured. An SFI-index field indicates a value associated with a combination of slot formats of one or more slots. The combination of slot formats may be configured via dedicated RRC signaling. A slot format in this combination may be indicated by a value which is an index to a row of a predefined table, where each row of the predefined table defines the symbol direction (DL, UL, or flexible symbols) of each symbol in the slot. When a slot format is indicated by a value of 255, the symbol directions for each symbol of the slot are determined based on the semi-static symbol directions configured via the TDD-UL-DL-ConfigCommon IE and optionally via the TDD-UL-DL-ConfigDedicated IE. For a serving cell operating in TDD with two UL carriers (e.g., the NUL carrier and the SUL carrier), the DCI format 2_0 may indicate the slot formats of both carriers. For a serving cell operating in FDD, the DCI format 2_0 may indicate the slot formats of both the DL and UL carriers.

For a set of semi-static DL symbols or semi-static flexible symbols, if the UE detects a DCI format 2_0 indicating slot formats of the set of symbols and a configured UL transmission (e.g., PUSCH, PUCCH, PRACH, or SRS) is included in the set of symbols, the UE may transmit the configured UL transmission if the symbols containing the configured UL transmission are indicated as UL symbols by the DCI format 2_0.

For a set of semi-static DL symbols or semi-static flexible symbols, if the UE does not detect a DCI format 2_0 indicating slot formats of the set of the symbols, but a configured uplink transmission (e.g., PUSCH, PUCCH, PRACH, or SRS) is included in the set of symbols and the last symbol of a CORESET where the UE attempted to detect a DCI format 2_0 candidate is at least a time period (or $T_{proc,2}$) before the first symbol containing the configured UL transmission, the UE may transmit the configured UL transmission.

For a set of semi-static DL symbols or semi-static flexible symbols, if the UE does not detect a DCI format 2_0 indicating slot formats of the set of symbols, but a configured UL transmission (e.g., PUSCH, PUCCH, PRACH, or SRS) is included in the set of symbols and the last symbol of a CORESET where the UE attempted to detect a DCI format 2_0 candidate is within $T_{proc,2}$ before the first symbol containing the configured UL transmission, the UE may transmit the configured UL transmission if the UE does not support the partial cancellation capability.

For a set of semi-static DL symbols or semi-static flexible symbols, if the UE does not detect a DCI format 2_0 indicating slot formats of the set of symbols, but a configured UL transmission (e.g., PUSCH, PUCCH, PRACH, or SRS) is included in the set of symbols and the last symbol of a CORESET where the UE attempted to detect a DCI format 2_0 candidate is within $T_{proc,2}$ before the first symbol containing the configured UL transmission, the UE may transmit partially the configured uplink transmission and cancel part of the configured UL transmission in the symbols that are at least the time duration, $T_{proc,2}$, after the last symbol of the CORESET if the UE supports the partial cancellation capability.

Logical Channel Prioritization (LCP)

For a UL grant associated with a new transmission, an LCP procedure may be performed to multiplex the MAC SDUs associated with one or more LCHs into a MAC PDU. Each LCH may be configured with an LCH priority, a prioritized bit rate, a bucket size duration. An LCH with a higher LCH priority is allocated resources before an LCH with a lower LCH priority. More specifically, a first LCH with a higher LCH priority may be allocated resources for a MAC SDU with a size determined based on a bucket size associated with the LCH, where the bucket size is determined based on the prioritized bit rate and the bucket size duration associated with the LCH. If there is remaining resources for the MAC PDU, a second LCH with a lower LCH priority may be allocated resources, and so on.

A PUSCH transmission may be skipped after the LCP is performed. For example, for a configured grant PUSCH, if the MAC entity is configured with a particular IE, such as the enhancedSkipUplinkTxConfigured IE set to the value "true," and (1) there is no UCI to be multiplexed on the PUSCH transmission, (2) no aperiodic CSI requested for the PUSCH transmission, (3) the MAC PDU includes zero MAC SDUs and includes only the periodic BSR, and (4) there is no data available for any LCG, or (5) the MAC PDU includes only the padding BSR, the MAC entity may not generate a MAC PDU. In other words, the PUSCH associated with the UL grant is not transmitted (skipped) in this scenario.

An LCH may be configured with LCP restrictions, such as the allowed serving cells, the allowed subcarrier spacings, the maximum PUSCH duration, the allowed configured grant configurations, the allowed physical layer priority, etc. For example, when a UL grant is associated with a configured grant configuration, if an LCH is configured with the allowed configured grant configurations, a MAC SDU of the LCH may be multiplexed in a MAC PDU for the UL grant if the allowed configured grant configurations include the configured grant configuration associated with the UL grant. Similarly, when a UL grant is a dynamic grant and is associated with a physical layer priority, if an LCH is configured with the allowed physical layer priority, a MAC SDU of the LCH may be multiplexed in a MAC PDU for the UL grant if the allowed physical layer priority of the LCH is associated with the UL grant.

LCH-Based Prioritization of UL Grants

Since a UE may be configured with more than one CG configurations in a UL BWP, there may be overlapping CG PUSCHs. In NR Release 16, an LCH-based prioritization mechanism is introduced to prioritize a UL grant over other UL grants when the DG PUSCHs or CG PUSCHs associated with the UL grants are overlapping. When the LCH-based prioritization mechanism is enabled for a UE, the UE may apply the LCH-based prioritization mechanism to select a UL grant or a SR in cases where a DG PUSCH overlaps with a CG PUSCH, a CG PUSCH overlaps with another CG PUSCH, or a CG PUSCH or DG PUSCH overlaps with a PUCCH for SR. Selecting a UL grant or an SR may also be referred as prioritizing the UL grant or the SR and deprioritizing other UL grants or SRs associated with the PUSCH or PUCCH resources overlapping with the PUSCH or PUCCH associated with the prioritized UL grant or SR.

The UE selects a UL grant or an SR associated with the highest LCH priority among the UL grants and SRs associated with the overlapping PUSCH or PUCCH resources. Specifically, the LCH priority associated with a UL grant may be determined by the highest priority among the priorities of the LCHs with MAC SDUs multiplexed in a MAC PDU for the UL grant, or by the highest priority among the priorities of the LCHs that have MAC SDUs available for multiplexing in a MAC PDU for the UL grant. The LCH priority associated with an SR may be determined by the priority of the LCH that triggered the SR. In a case where the LCH priority associated with a dynamic UL grant is the same as the LCH priority associated with a configured UL grant, the dynamic UL grant is prioritized. In a case where the LCH priority associated with an SR is the same as the LCH priority associated with a UL grant, the UL grant is prioritized.

Indication of Unused PUSCH Occasions

Given the variable packet size characteristic of the XR services, more than one PUSCH occasion within a CG periodicity may be needed to support the transmission of a large packet, as it might not be possible to transmit such a large packet in just one PUSCH occasion. However, some packets may be smaller in size. In these cases, when it is sufficient to transmit a small packet via a single PUSCH occasion, other PUSCH occasions configured for the UE within the same CG periodicity may not be needed and may not be used for PUSCH transmission. As a result, the resources allocated for these other PUSCH occasions could go unused, leading to wastage. To optimize the radio resource utilization, it is advantageous for the UE to indicate (any) the unused PUSCH occasions to the gNB, so that the gNB may reallocate the resources of the unused PUSCH occasions to other UEs.

In the present disclosure, the terms "CG periodicity" and "CG period" may be utilized interchangeably.

Indication of Unused PUSCH Occasions

In some implementations, a UE may be configured with more than one PUSCH occasions within a CG periodicity via a CG configuration. In the CG configuration, the number of PUSCH occasions within a CG periodicity (denoted by N) may be provided, along with one or more of the following configurations: the time domain symbol allocation, the frequency resource allocation, the DMRS configuration, the MCS, the periodicity, the number of repetitions, the number of HARQ processes, the transform precoding, etc. In some implementations, a TDRA table, specifically used for the allocation of multiple PUSCH occasions for a CG configuration, may be configured via the RRC signaling. In the TDRA table, one or more rows may be configured, and each row may include information, such as one or more slot offsets (k2), and one or more start symbol and length indicator values (SLIVs), where an SLIV may indicate the time domain resource allocation of a PUSCH occasion. k2 may be provided for each PUSCH occasion, and a default value may be applied if k2 is not provided. To allocate multiple PUSCH occasions within a CG periodicity for a Type-1 CG, a particular IE, such as the timeDomainAllocation IE may indicate a row of the TDRA table specifically used for the allocation of multiple PUSCH occasions. To allocate multiple PUSCH occasions within a CG periodicity for a Type-2 CG, the TDRA field of the activation DCI (e.g., a DCI format 0_0, a DCI format 0_1, or a DCI format 0_2 with CRC scrambled by a CS-RNTI and with an NDI set to 0) may indicate a row of the TDRA table specifically used for the allocation of multiple PUSCH occasions.

For a PUSCH transmission in FR1, the TDRA table specifically used for the allocation of multiple PUSCH occasions may not be used for the dynamic PUSCH scheduling or the CG PUSCH retransmission. For example, a second TDRA table may be configured via the RRC signaling. In the second TDRA table, one or more rows may be configured, and each row may include the information, such as at least one slot offset (k2) and at least one start symbol and length indicator value (SLIV). Therefore, a CG retransmission may be scheduled by a DCI format 0_0, a DCI format 0_1, or a DCI format 0_2 with CRC scrambled by a CS-RNTI and with an NDI set to 1, and the TDRA field of the DCI format may indicate a row of the second TDRA table.

FIG. 1 is a diagram illustrating multiple PUSCH occasions within a CG periodicity, according to an example implementation of the present disclosure. The UE may determine the location of each PUSCH occasion within a CG periodicity based on a CG configuration, for example, provided by a BS. As depicted in FIG. 1, the periodicity of CG PUSCH is 4 slots, and the number of PUSCH occasions within a CG periodicity is 3 (N=3). The first PUSCH occasion 102 within a CG periodicity is followed by two more PUSCH occasions 104 and 106. The PUSCH occasions 102, 104, and 106 may be recurrently present in every CG periodicity, with the first PUSCH occasion 102 being followed by the subsequent PUSCH occasions 104 and 106.

In this example, the PUSCH occasions 102, 104, and 106 are in consecutive slots, although it is also possible to configure the PUSCH occasions in non-consecutive slots. Furthermore, the time domain symbol allocation within a slot is the same for each PUSCH occasion in this example, but it is possible to configure different time domain symbol allocations for different PUSCH occasions.

In some implementations, an indication may be multiplexed (or transmitted) in at least one of the PUSCH occasions within a CG periodicity to indicate those unused PUSCH occasions within the CG periodicity. In some implementations, the indication may be transmitted via a PUCCH associated with one or more PUSCH occasions within a CG periodicity. The indication used to indicate the unused PUSCH occasions may also be referred to as an unused PUSCH indication (UPI) in the present disclosure.

Figure 2:
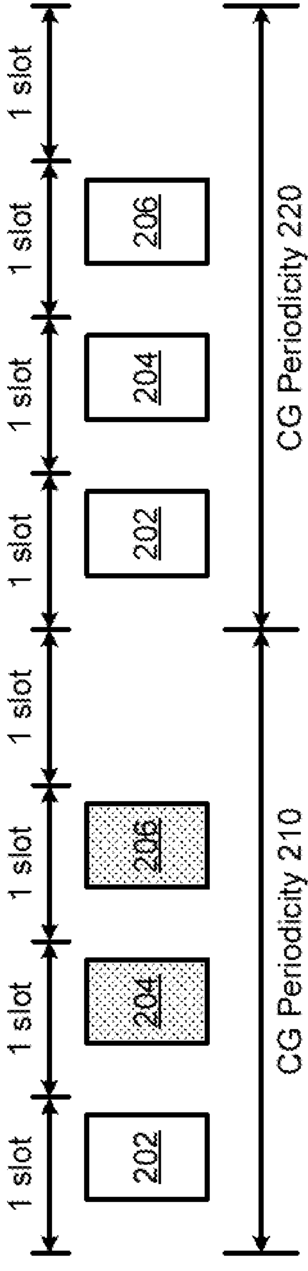
FIG. 2 is a diagram illustrating that the last M PUSCH occasions within a CG periodicity are indicated as unused, according to an example implementation of the present disclosure.

In some implementations, a UPI may indicate the last M PUSCH occasions (e.g., M is a positive integer) that are unused within a CG periodicity, as illustrated in FIG. 2.

FIG. 2 is a diagram illustrating that the last M PUSCH occasions within a CG periodicity are indicated as unused, according to an example implementation of the present disclosure. In FIG. 2, the UPI may be transmitted by the UE in the first PUSCH occasion 202 of the first CG periodicity 210 to indicate that the second and the third PUSCH occasions 204 and 206 within the same CG periodicity 210 are not used by the UE. In some implementations, the UPI may include a value of 2, indicating that the last two PUSCH occasions 204 and 206 within the CG periodicity 210 are not used by the UE. If no PUSCH occasions are unused within a CG periodicity, the UPI may include a value of 0. For example, the UPI for the subsequent CG periodicity 220 may include a value of 0, indicating that all PUSCH occasions 202, 204 and 206 within the CG periodicity 220 are scheduled to be used by the UE.

To reduce the signaling overhead, the indicated unused PUSCH occasions may correspond to those PUSCH occasions that are valid. In some implementations, a PUSCH occasion may be considered valid if the (OFDM) symbols in the PUSCH occasion are of one or more specific types. Otherwise, the PUSCH occasion may be considered as invalid. The specific types of symbols may be the UL symbols configured by the TDD-UL-DL-ConfigCommon IE if only the TDD-UL-DL-ConfigCommon IE is configured. If both the TDD-UL-DL-ConfigCommon IE and the TDD-UL-DL-ConfigDedicated IE are configured, the specific types of symbols may include UL symbols configured by either the TDD-UL-DL-ConfigCommon IE or the TDD-UL-DL-ConfigDedicated IE.

Figure 3:
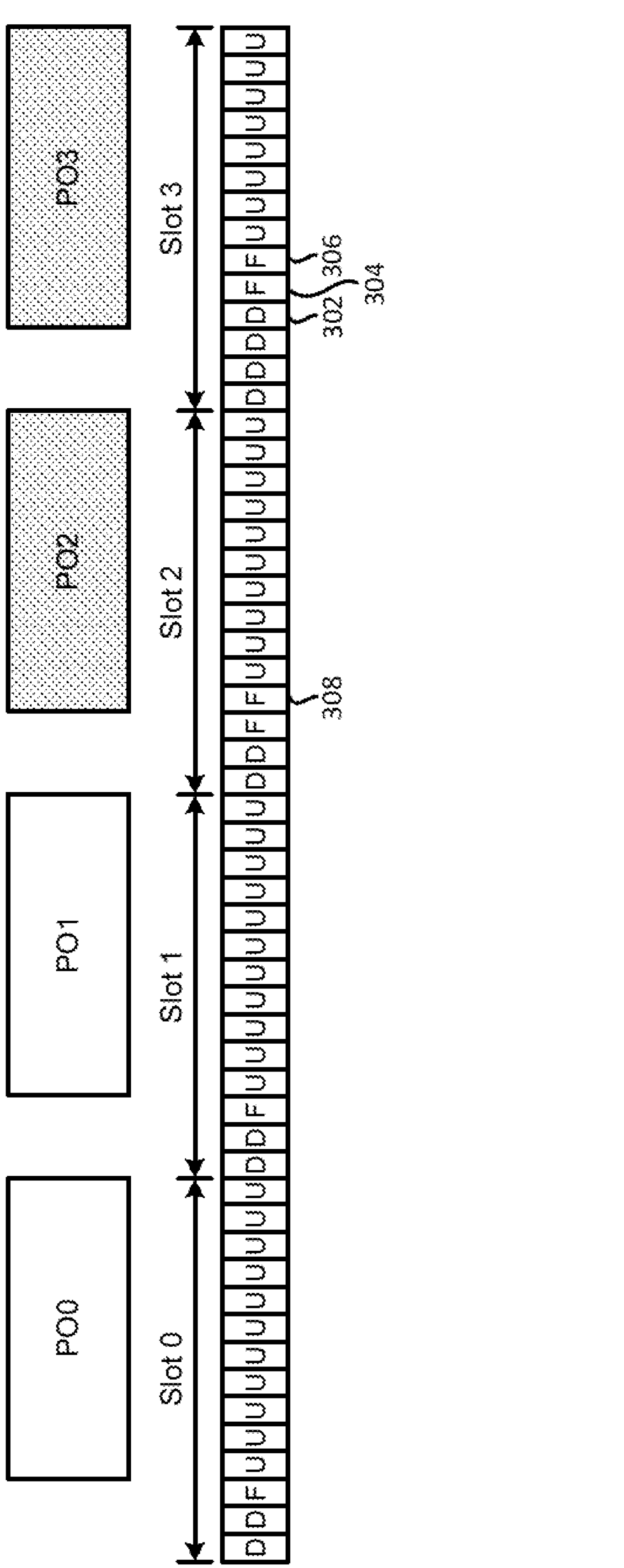
FIG. 3 is a diagram illustrating multiple PUSCH occasions within a CG periodicity, according to an example implementation of the present disclosure.

FIG. 3 is a diagram illustrating multiple PUSCH occasions within a CG periodicity, according to an example implementation of the present disclosure. As illustrated in FIG. 3, there are four PUSCH occasions PO0, PO1, PO2, and PO3 within a CG periodicity. The third PUSCH occasion PO2 and the fourth PUSCH occasion PO3 are invalid since they contain DL symbols (denoted by D in the figure) or flexible symbols (denoted by F in the figure). As illustrated in FIG. 3, the DL symbol 302 and the flexible symbols 304 and 306 overlap with the PUSCH occasion PO3, and the flexible symbol 308 overlaps with the PUSCH occasion PO2. In this example, if the UPI used for indicating unused PUSCH occasions indicates a value of 1, it means that the last valid PUSCH occasion in the CG periodicity, namely PO1 (where all symbols are UL symbols, which are denoted by U in this figure), is the one that is unused within the CG periodicity.

In some implementations, the specific types of symbols may include UL symbols or flexible symbols configured by the TDD-UL-DL-ConfigCommon IE if only the TDD-UL-DL-ConfigCommon IE is configured. If both the TDD-UL-DL-ConfigCommon IE and the TDD-UL-DL-ConfigDedicated IE are configured, the specific types of symbols may include UL symbols or flexible symbols configured by the TDD-UL-DL-ConfigCommon IE or the TDD-UL-DL-ConfigDedicated IE.

Figure 4:
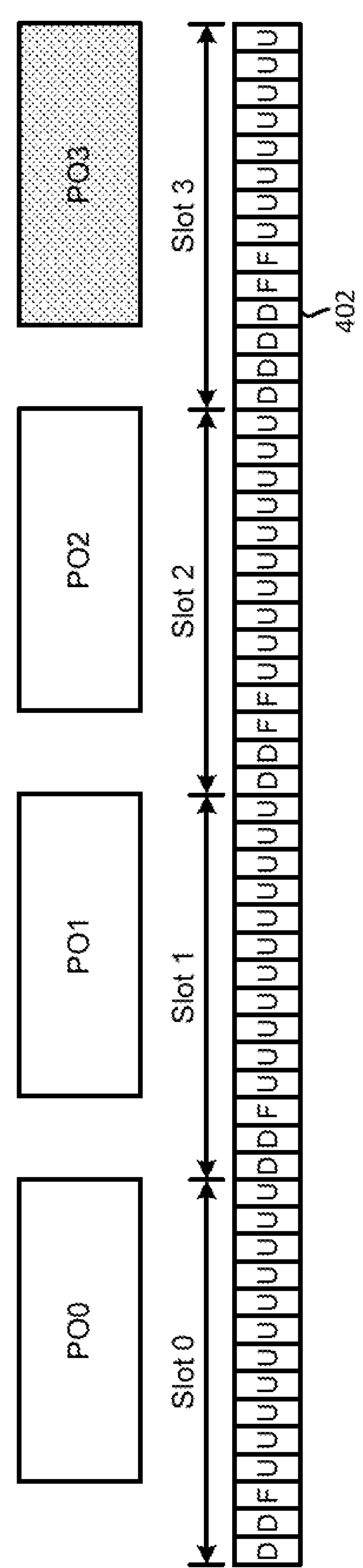
FIG. 4 is a diagram illustrating multiple PUSCH occasions within a CG periodicity, according to an example implementation of the present disclosure.

FIG. 4 is a diagram illustrating multiple PUSCH occasions within a CG periodicity, according to an example implementation of the present disclosure. As illustrated in FIG. 4, there are four PUSCH occasions PO0, PO1, PO2, and PO3 within a CG periodicity. Among the PUSCH occasions PO0, PO1, PO2, and PO3 within the CG periodicity, only the fourth PUSCH occasion PO3 is determined as invalid because it contains at least one DL symbol (e.g., the DL symbol 402, which is denoted by D in the figure). The UL symbols and flexible symbols are denoted by U and F in the figure, respectively.

In this example, if the UPI used for indicating the unused PUSCH occasions indicates a value of 1, it means that the last valid PUSCH occasion in the CG periodicity, namely PO2 (where no DL symbols is included), is the unused PUSCH occasion within the CG periodicity.

In some implementations, the specific types of symbols may be UL symbols or flexible symbols configured by the TDD-UL-DL-ConfigCommon IE if only the TDD-UL-DL-ConfigCommon IE is configured. The specific types of symbols may be UL symbols or flexible symbols configured by the TDD-UL-DL-ConfigCommon IE or the TDD-UL-DL-ConfigDedicated IE if the TDD-UL-DL-ConfigCommon IE and the TDD-UL-DL-ConfigDedicated IE are configured. In addition, if the UE is configured to monitor a DCI format 2_0, the specific types of symbols may include semi-static flexible symbols that are indicated as UL symbols, but do not include semi-static flexible symbols that are not indicated as UL symbols. This benefits by determining the PUSCH occasions that cannot be used for UL transmission as invalid, potentially saving signaling overhead for indicating unused PUSCH occasions.

In some implementations, the PUSCH occasions containing semi-static flexible symbols may be determined as valid PUSCH occasions even if the semi-static flexible symbols are indicated as DL or flexible symbols by a DCI format 2_0. In other words, the PUSCH occasions may be determined as valid even if the PUSCH occasions cannot be used for UL transmission. There may be a trade-off between potential errors and signaling overhead when implementing the mechanism of indicating the unused PUSCH occasions. Furthermore, discrepancies between the UE and the gNB in determining valid and invalid PUSCH occasions may occur if a DCI format 2_0 is mis-detected.

In some implementations, the bitwidth of the UPI (denoted by $O_{UPI}$) may be determined based on the maximum number of PUSCH occasions that can be indicated as unused PUSCH occasions (denoted by $M_{max}$). For example, if there are 4 PUSCH occasions within a CG periodicity, the bitwidth of the UPI may be determined as $\lceil \log_2(4+1) \rceil=3$ bits. The maximum number of PUSCH occasions that may be indicated as unused PUSCH occasions may be determined based on valid PUSCH occasions. For example, as illustrated in FIG. 4, since there are 3 valid PUSCH occasions (e.g., PUSCH occasions PO0, PO1, and PO2) in the CG periodicity, the bitwidth of the UPI may be determined as $\lceil \log_2(3+1) \rceil=2$ bits.

In some implementations, to reduce the signaling overhead, the PUSCH occasions that can be indicated as unused PUSCH occasions may not include the first PUSCH occasion within a CG periodicity. For example, the PUSCH occasions that can be indicated as unused PUSCH occasions may only include the PUSCH occasions that occur at least a certain time duration after the first PUSCH occasion within a CG periodicity. The time duration may be needed by the gNB to process the indication (e.g., the UPI) received in a PUSCH occasion and to reallocate the unused PUSCH occasions to other UEs.

Figure 5:
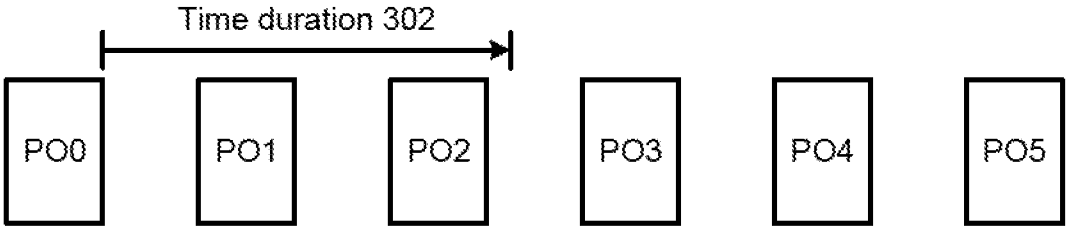
FIG. 5 is a diagram illustrating a time duration after the first PUSCH occasion within a CG periodicity, according to an example implementation of the present disclosure.

FIG. 5 is a diagram illustrating a time duration 302 after the first PUSCH occasion within a CG periodicity, according to an example implementation of the present disclosure. As illustrated in FIG. 5, there are six PUSCH occasions PO0, PO1, PO2, PO3, PO4, and PO5 within a CG periodicity. The UPI may be transmitted in the PUSCH occasion PO0. Since the PUSCH occasions PO1 and PO2 are within the time duration 302 after the PUSCH occasion PO0, they cannot be reallocated to other UEs. Conversely, the PUSCH occasions PO3, PO4 and PO5 can be reallocated to other UEs and thus can be indicated as unused PUSCH occasions. Therefore, the bitwidth of the UPI may be determined as $\lceil \log_2(3+1) \rceil=2$ bits. In some implementations, the time duration 302 may be configured by the gNB via RRC signaling. In some implementations, such a time duration (in which the PUSCH occasions can not be reallocated to other UEs) may be set to 0 or not configured. In such cases, the PUSCH occasions that may be indicated as unused PUSCH occasions may include all PUSCH occasions except the first PUSCH occasion in the CG periodicity.

In some implementations, the bitwidth of UPI may be determined differently for UPI transmitted in different PUSCH occasions. For example, the PUSCH occasions that can be indicated as unused PUSCH occasions may include the PUSCH occasions occurring at least a certain time duration after the PUSCH occasion in which the UPI is multiplexed. Since the number of PUSCH occasions that can be indicated as unused may differ depending on where the UPI is transmitted, the corresponding bitwidth may vary accordingly.

In some implementations, the maximum number of PUSCH occasions that can be indicated as unused PUSCH occasions (denoted as $M_{max}$) may be configured via RRC signaling, e.g., as part of the CG configuration. The bitwidth of UPI may be determined as $\lceil \log_2(M_{max}+1) \rceil$ bits. If there are invalid PUSCH occasions among the last $M_{max}$ PUSCH occasions within a CG periodicity, the bitwidth of UPI may be determined based on the number of valid PUSCH occasions of the last $M_{max}$ PUSCH occasions in the CG periodicity.

In some implementations, the bitwidth of UPI (denoted as $O_{UPI}$) may be configured via RRC signaling, e.g., as part of the CG configuration. The last $2^{O_{UPI}}-1$ valid PUSCH occasions can be indicated as unused PUSCH occasions.

In some implementations, the bitwidth of UPI is 1 bit. When the UPI indicates a value of 1, all PUSCH occasions after the PUSCH occasion where the UPI is transmitted are indicated as unused. When the UPI indicates a value of 0, all PUSCH occasions after the PUSCH occasion where the UPI is transmitted are indicated as used. It should be noted that in this disclosure, the use of "value of 1" and "value of 0" is not intended to limit the scope of the invention. The "value of 1" could be represented by any arbitrary "first value," and similarly, the "value of 0" could be represented by a different "second value."

In some implementations, the UE may indicate to the gNB unused PUSCH occasions on a per CG periodicity basis. That is, once the UE indicates one or more CG periodicities as unused, the PUSCH occasions within the time intervals determined by the one or more CG periodicities are considered unused. The number of CG periodicities may be interpreted as the number of CG periodicities counted from the upcoming CG periodicity after the UPI is transmitted.

In some implementations, the UPI may be transmitted in one or more PUSCH occasions within a CG periodicity. In some implementations, the PUSCH occasion where the UPI is transmitted may be the first PUSCH occasion within a CG periodicity. In other words, the UPI may only be transmitted in the first PUSCH occasion and not in others within a CG periodicity.

In some implementations, the one or more PUSCH occasions where the UPI is transmitted may be a subset of PUSCH occasions within a CG periodicity. The subset of PUSCH occasions may be configured via the CG configuration.

In some implementations, the one or more PUSCH occasions where the UPI is transmitted may be all PUSCH occasions (e.g., all PUSCH occasions that are actually used by the UE, which do not include any PUSCH occasion(s) that are considered unused, or all PUSCH occasions scheduled by the CG configuration) within a CG periodicity. This approach is beneficial as it allows for the UPI to still be transmitted in other PUSCH occasions if, for example, the first PUSCH occasion is not transmitted. For example, the UE may cancel the first PUSCH occasion in response to receiving a cancellation indication from a DCI format 2_4 or a slot format indication from a DCI format 2_0. Alternatively, the UL grant associated with the first PUSCH occasion may be deprioritized due to LCH-based prioritization, or the first PUSCH occasion may not be transmitted/used due to the jitter of XR traffic, resulting in no TB being built for transmission in the first PUSCH occasion. In these scenarios, the UPI may be transmitted in the PUSCH occasions that follow the first PUSCH occasion within the CG periodicity.

In some implementations, the one or more PUSCH occasions may be all PUSCH occasions except the last K PUSCH occasions within a CG periodicity. K may be determined based on the CG configuration. For example, K may be configured by an RRC parameter. For example, K may be determined based on a time duration configured in the CG configuration. The gNB may need to process the UPI and reallocate the PUSCH resources of other PUSCH occasions.

Figure 6:
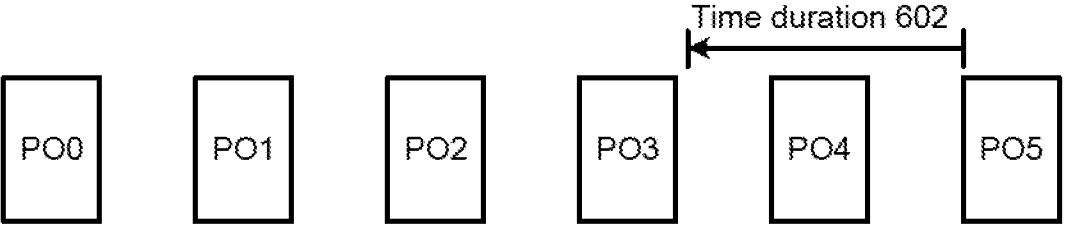
FIG. 6 is a diagram illustrating a time duration before the start of the last PUSCH occasion within a CG periodicity, according to an example implementation of the present disclosure.

FIG. 6 is a diagram illustrating a time duration 602 before the start of the last PUSCH occasion within a CG periodicity, according to an example implementation of the present disclosure. As illustrated in FIG. 6, the UE may determine that there are six PUSCH occasions (PO0, PO1, PO2, PO3, PO4, and PO5) within a CG periodicity according to the CG configuration. Since the PUSCH occasion PO4 is within the time duration 602 before the start of the last PUSCH occasion PO5 in the CG periodicity, the UE may not transmit the UPI in the PUSCH occasion PO4. For the example illustrated in FIG. 6, K may be determined to be 2, corresponding to the PUSCH occasions PO4 and PO5. In some implementations, for simplicity, the time duration 602 may be set to 0 or not configured. In such cases, K may be equal to 1.

In some implementations, the PUSCH occasion where the UPI is transmitted may be the first (actually) transmitted PUSCH occasion within a CG periodicity. The first transmitted PUSCH occasion may or may not be the first PUSCH occasion in the CG periodicity. For example, the first transmitted PUSCH occasion may not be the first PUSCH occasion within the CG periodicity (1) in a case that the UE cancels the first PUSCH occasion in response to receiving a cancellation indication indicated via a DCI format 2_4 or a slot format indication indicated via a DCI format 2_0, (2) in a case that the UL grant associated with the first PUSCH occasion is deprioritized as a result of the LCH-based prioritization, or (3) in a case that the first PUSCH occasion is not transmitted due to jitter of XR traffic. This approach is beneficial as it allows for the UPI to be transmitted in another PUSCH occasion if the first PUSCH occasion is not transmitted/used by the UE.

In some implementations, the one or more PUSCH occasions where the UPI is transmitted may be a subset of PUSCH occasions within a CG periodicity. Whether a PUSCH occasion is included in the subset of PUSCH occasions may be determined based on whether the UCI is multiplexed in the PUSCH occasion or based on the number of UPI bits $O_{UPI}$. For example, the UE may multiplex the UPI in a PUSCH occasion if the UCI (e.g., including the HARQ-ACK) is multiplexed in the PUSCH occasion. For example, the UE may multiplex the UPI in a PUSCH occasion if the $O_{UPI}$ of the UPI is larger than a threshold, e.g., 2 bits. The UE may multiplex the UPI in the PUSCH occasion in the first transmitted PUSCH occasion within a CG periodicity regardless of whether the UCI is multiplexed in the first transmitted PUSCH occasion.

In some implementations, since the gNB may not know in which PUSCH occasion the UE will multiplex/transmit the UPI, the approach for resource element mapping of UCI may need to be designed such that the multiplexing of the UPI in a PUSCH occasion does not affect the resource element mapping of the UCI. To achieve this, a number of resource elements $Q'_{UPI}$ may be reserved for the UPI. For example, $Q'_{UPI}$ may be determined as:

$$Q'_{UPI} = \min\left\{\left\lceil \frac{(O_{UPI} + L_{UPI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil \right\}$$

where $O_{UPI}$ is the number of UPI bits, which may be determined based on the above methods;

$L_{UPI}$ is the number of CRC bits for UPI. $L_{UPI}$ is equal to 0 if $O_{UPI}<12$, $L_{UPI}$ is equal to 6 if $12 \le O_{UPI} \le 19$, and $L_{UPI}$ is equal to 11 if $O_{UPI} \ge 20$;

$$\beta_{offset}^{PUSCH} = \beta_{offset}^{UPI},$$

wherein $$\beta_{offset}^{UPI}$$

is configured via RRC signaling. Alternatively, $$\beta_{offset}^{PUSCH} = \beta_{offset}^{HARQ-ACK};$$

$C_{UL-SCH}$ is the number of code blocks for the UL-SCH of the PUSCH transmission;

$K_r$ is the r-th code block size for the UL-SCH of the PUSCH transmission;

$$M_{sc}^{PUSCH}$$

is the scheduled bandwidth of the PUSCH transmission, expressed as a number of subcarriers;

$$M_{sc}^{RS\text{-}PT}(l)$$

is the number of subcarriers in OFDM symbol l that carries PTRS, in the PUSCH transmission;

$$M_{sc}^{UCI}(l)$$

is the number of resource elements that can be used for transmission of UCI in OFDM symbol l, for $$l = 0, 1, 2, \ldots, N_{symb,all}^{PUSCH} - 1,$$

in the PUSCH transmission and $$N_{symb,all}^{PUSCH}$$

is the total number of OFDM symbols of the PUSCH, including all OFDM symbols used for DMRS;

for any OFDM symbol that carries DMRS of the PUSCH, $$M_{sc}^{UCI}(l)=0;$$

for any OFDM symbol that does not carry DMRS of the PUSCH, $$M_{sc}^{UCI}(l)=M_{sc}^{PUSCH}-M_{sc}^{PT\text{-}RS}(l);$$

α is configured by higher layer parameter scaling; and $l_0$ is the symbol index of the first OFDM symbol that does not carry DMRS of the PUSCH, after the first DMRS symbol(s), in the PUSCH transmission.

In some implementations, the mapping of the $$Q'_{UPI}$$

reserved resource elements in a PUSCH occasion may be performed first. The resource elements used for multiplexing the CSI part 1 may be determined by excluding the number of reserved resource elements $$Q'_{UPI}.$$

More specifically, the mapping of reserved resource elements and modulated symbols of the UCI or the UL-SCH to the resource elements of the PUSCH occasion may include steps I to V described as follows. The mapping of reserved resource elements or modulated symbols is carried out firstly in ascending order of subcarrier indexes and secondly in ascending order of (OFDM) symbol indexes. If the number of available resource elements of the PUSCH occasion in symbol l for mapping the reserved resource elements or modulated symbols of a type of information is less than or equal to the remaining number of reserved resource elements or modulated symbols of the type of information that have not yet been mapped, all available resource elements for mapping the reserved resource elements or modulated symbols of the type of information in symbol l are used for the mapping. If the number of available resource elements of the PUSCH occasion in symbol l for mapping the reserved resource elements or modulated symbols of the type of information is greater than the remaining number of reserved resource elements or modulated symbols of the type of information that have not yet mapped, a subset of available resource elements in symbol l for mapping the reserved resource elements or modulated symbols of the type of information are used for the mapping. The subset of available resource elements used for mapping may be non-consecutive in frequency, e.g., when the ratio of available resource elements in symbol l to the remaining number of reserved resource elements or modulated symbols of the type of information is equal to or greater than 2.

In the first step (I), as described above, the number of reserved resource elements $Q'_{UPI}$ is calculated, and the corresponding reserved resource elements are mapped to the PUSCH occasion. The mapping may start from the resource element corresponding to the first subcarrier in the PUSCH occasion with the lowest index and the first symbol following the first symbol carrying the DMRS of the PUSCH occasion. An example is illustrated in FIG. 7, as described below.

Figure 7:
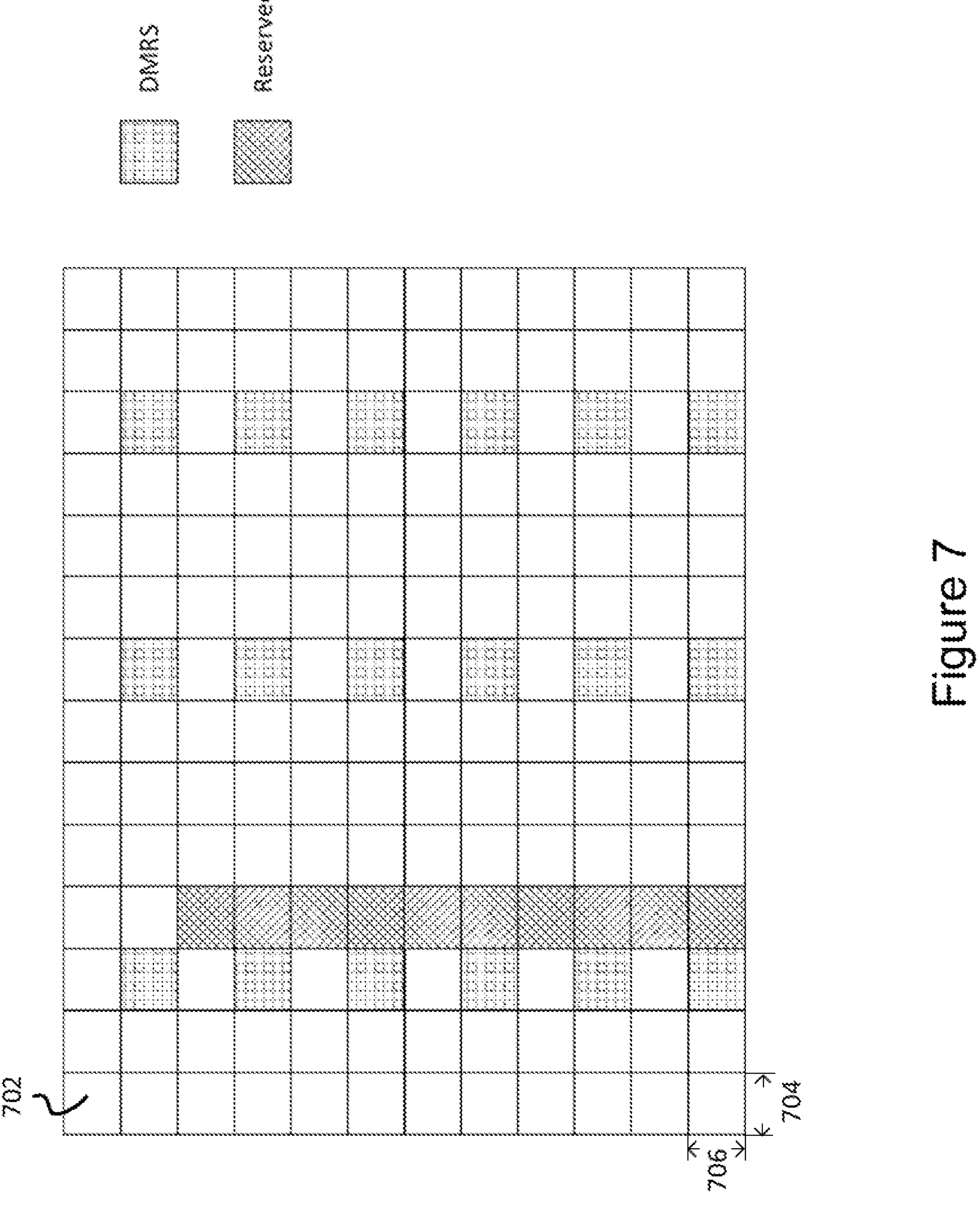
FIG. 7 is a diagram illustrating the mapping of resource elements and radio signals, according to an example implementation of the present disclosure.

FIG. 7 is a diagram illustrating the mapping of resource elements and radio signals, according to an example implementation of the present disclosure. As illustrated in FIG. 7, each square 702 represents one resource element. The horizontal width 704 of each square 702 corresponds to one symbol, while its vertical height 706 denotes one subcarrier. Additionally, various shadings within the squares are utilized to distinguish their functions, such as for transmitting the DMRS or for serving as a reserved resource element (RE).

In the second step (II), as described above, the number of resource elements $Q'_{CSI\text{-}1}$ is calculated and the modulated symbols of the CSI part 1 are mapped to the $Q'_{CSI\text{-}1}$ resource elements of the PUSCH occasion. The mapping may start from the resource element corresponding to the first subcarrier in the PUSCH occasion with the lowest index and the first symbol of the PUSCH occasion. If a resource element has been reserved (e.g., a reserved resource element is mapped to the resource element), the resource element is not used for mapping a modulated symbol of the CSI part 1. An example is illustrated in FIG. 8A, as described below.

Figure 8A:
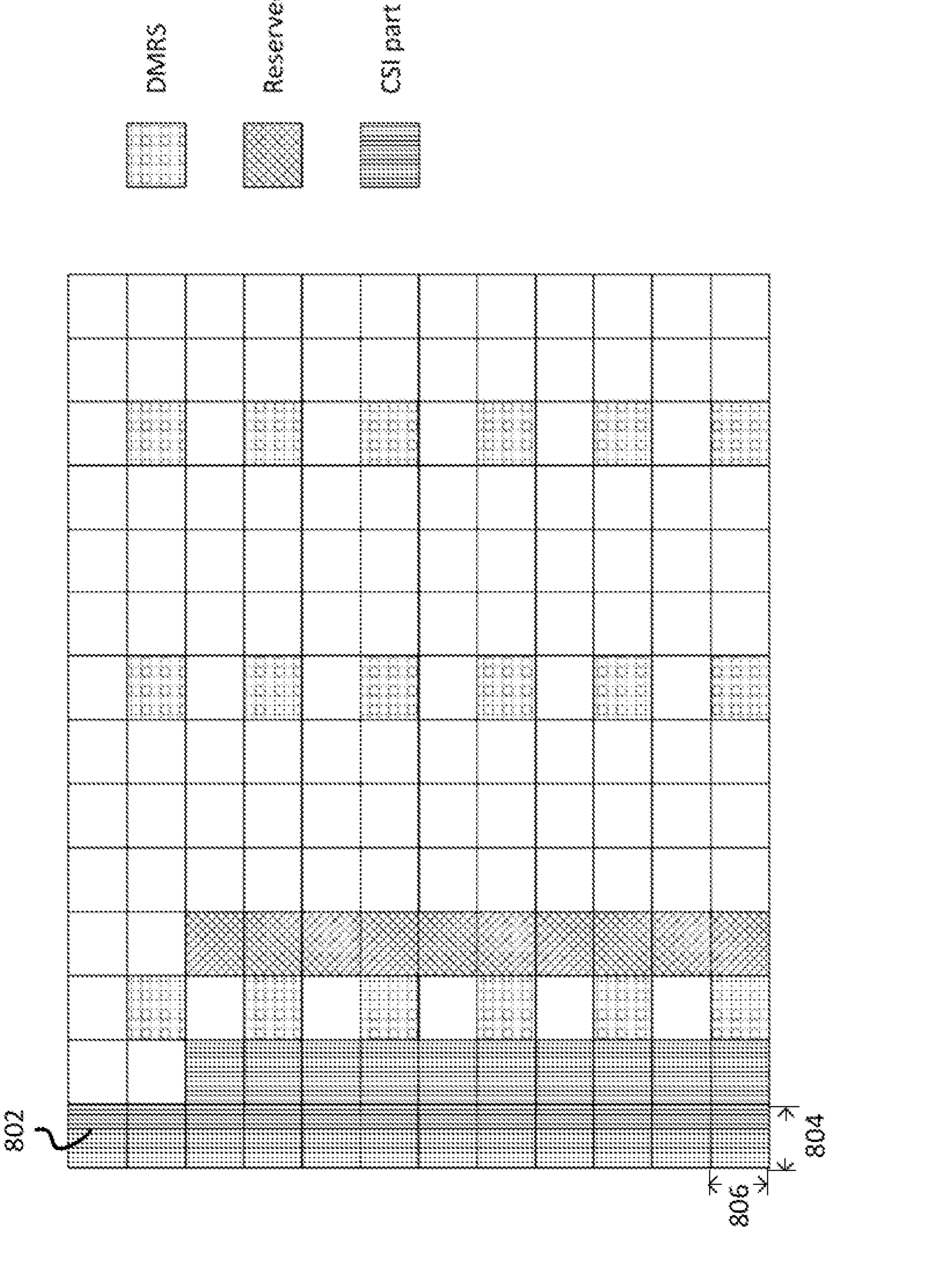
FIG. 8A is a diagram illustrating the mapping of resource elements and radio signals, according to an example implementation of the present disclosure.

FIG. 8A is a diagram illustrating the mapping of resource elements and radio signals, according to an example implementation of the present disclosure. As illustrated in FIG. 8A, each square 802 represents one resource element. The horizontal width 804 of each square 802 corresponds to one symbol, while its vertical height 806 denotes one subcarrier. Additionally, various shadings within the squares are utilized to distinguish their functions, such as for transmitting the DMRS or the CSI part 1, or for serving as a reserved resource element (RE). In some implementations, the second step II may be omitted if the CSI is not multiplexed in the PUSCH occasion.

In the third step (III), as described above, the number of resource elements $Q'_{CSI\text{-}2}$ is calculated and the modulated symbols of the CSI part 2 are mapped to the $Q'_{CSI\text{-}2}$ resource elements of the PUSCH occasion. The mapping may start from (i) the next resource element after the last resource element used for mapping a modulated symbol of the CSI part 1 or (ii) the resource element corresponding to the first subcarrier in the PUSCH occasion with the lowest index and the first symbol after the first symbol carrying the DMRS of the PUSCH occasion. Option (i) may be used if the symbol index of its symbol index is smaller than the symbol index of option (ii). Otherwise, option (ii) may be used.

If a resource element is a reserved resource element, this resource element is used for mapping a modulated symbol of the CSI part 2. For example, if the last mapped resource element for the CSI part 1 corresponds to subcarrier k' and symbol l', the first mapped resource element for the CSI part 2 corresponds to subcarrier k'+1 and symbol l' in a case that subcarrier k'+1 is included in the PUSCH occasion, or the first mapped resource element for the CSI part 2 corresponds to subcarrier k and symbol l'' in a case that subcarrier k'+1 is not included in the PUSCH occasion, where subcarrier k is the subcarrier with the lowest index of the PUSCH occasion and symbol l" is the first symbol not carrying the DMRS after symbol l'. An example is illustrated in FIG. 8B, as described below.

Figure 8B:
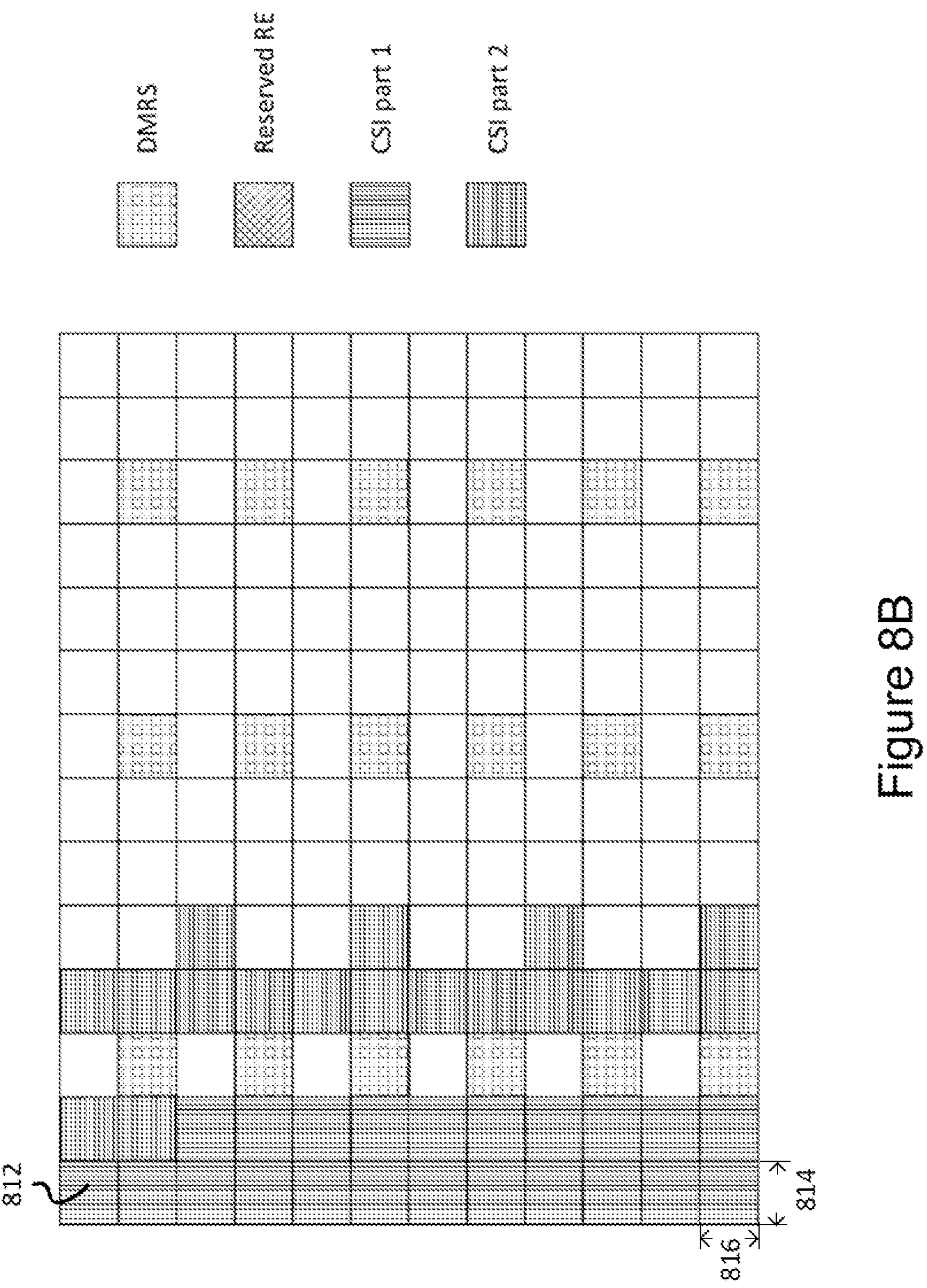
FIG. 8B is a diagram illustrating the mapping of resource elements and radio signals, according to an example implementation of the present disclosure.

FIG. 8B is a diagram illustrating the mapping of resource elements and radio signals, according to an example implementation of the present disclosure. As illustrated in FIG. 8B, each square 812 represents one resource element. The horizontal width 814 of each square 812 corresponds to one symbol, while its vertical height 816 denotes one subcarrier. Additionally, various shadings within the squares are utilized to distinguish their functions, such as for transmitting the DMRS, the CSI part 1, or the CSI part 2, or for serving as a reserved resource element (RE). In some implementations, the third step III may be omitted if the CSI is not multiplexed in the PUSCH occasion or if there is no CSI part 2.

In the fourth step (IV), as described above, the modulated symbols of a UL-SCH (e.g., a TB) may be mapped to the remaining resource elements of the PUSCH occasion. The mapping may start from the next resource element after the last resource element used for mapping the modulated symbol of the CSI part 2. If a resource element is a reserved resource element, the resource element may be used for mapping a modulated symbol of a UL-SCH. An example is illustrated in FIG. 9, as described below.

Figure 9:
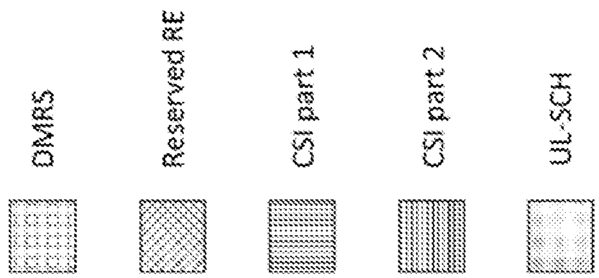
FIG. 9 is a diagram illustrating the mapping of resource elements and radio signals, according to an example implementation of the present disclosure.
Figure 9:
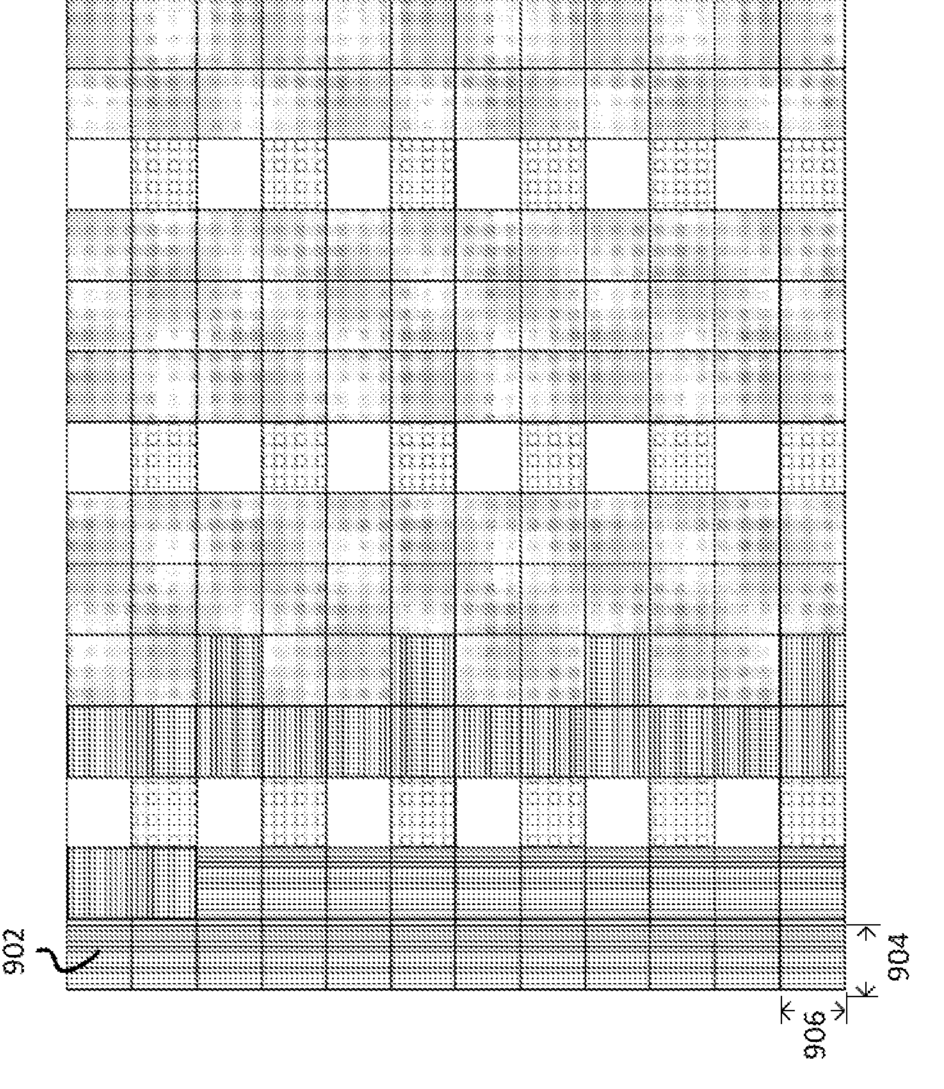

FIG. 9 is a diagram illustrating the mapping of resource elements and radio signals, according to an example implementation of the present disclosure. As illustrated in FIG. 9, each square 902 represents one resource element. The horizontal width 904 of each square 902 corresponds to one symbol, while its vertical height 906 denotes one subcarrier. Additionally, various shadings within the squares are utilized to distinguish their functions, such as for transmitting the DMRS, the CSI part 1, the CSI part 2, or the UL-SCH, or for serving as a reserved resource element (RE).

In the fifth step (V), as described above, the modulated symbols of the UPI may be mapped to the reserved resource elements. If the modulated symbol of the CSI part 2 or the UL-SCH is mapped in the reserved resource element in any of the previous steps, the modulated symbol of the CSI part 2 or the UL-SCH may be punctured by the modulated symbol of the UPI. An example is illustrated in FIG. 10, as described below.

Figure 10:
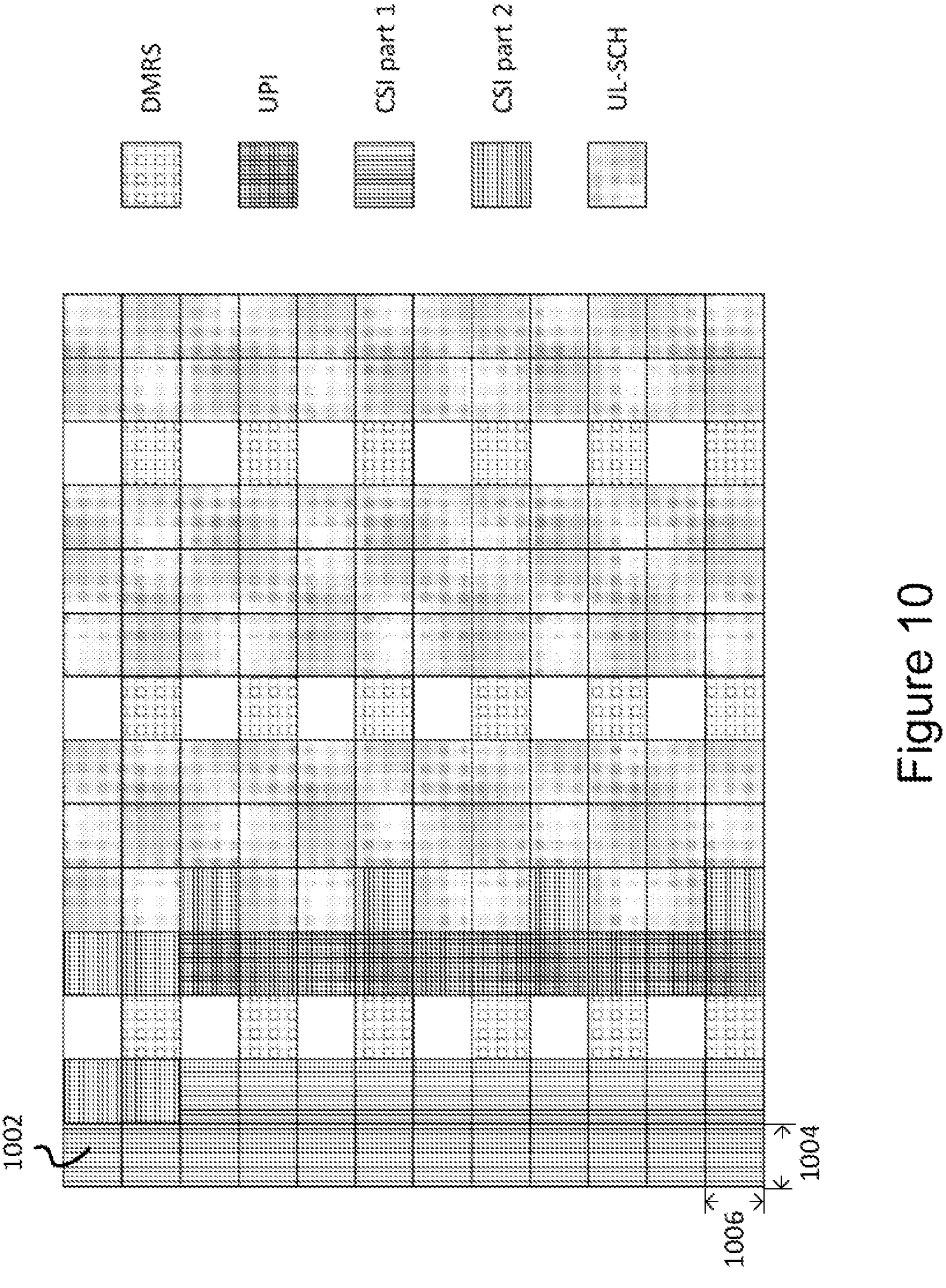
FIG. 10 is a diagram illustrating the mapping of resource elements and radio signals, according to an example implementation of the present disclosure.

FIG. 10 is a diagram illustrating the mapping of resource elements and radio signals, according to an example implementation of the present disclosure. As illustrated in FIG. 10, each square 1002 represents one resource element. The horizontal width 1004 of each square 1002 corresponds to one symbol, while its vertical height 1006 denotes one subcarrier. Additionally, various shadings within the squares are utilized to distinguish their functions, such as for transmitting the DMRS, the UPI, the CSI part 1, the CSI part 2, or the UL-SCH. In some implementations, the fifth step (V) may be omitted if the UPI is not multiplexed in the PUSCH occasion.

In some implementations, the $Q'_{UPI}$ resource elements may be reserved for the UPI if the $O_{UPI}$ is equal to or less than a certain threshold, e.g., 2 bits.

In some implementations, if the $O_{UPI}$ exceeds the threshold (e.g., 2 bits), no resource element is reserved for the UPI. In this scenario, the mapping of the modulated symbols of the UPI, the UCI and the UL-SCH to the resource elements may follow a series of modified steps (I' to IV'), which exhibit certain differences from the previous steps I to V. The first difference is that the modulated symbols of the UPI may be directly mapped to the number of resource elements $Q'_{UPI}$ in the modified first step (I'), where the resource elements may be determined in the same manner as that for the reserved resource elements as described above. The second difference is that, since there are no reserved resource elements, if a resource element is used for mapping the UPI, this resource element is not used for mapping a modulated symbol of the CSI part 2 or the UL-SCH. The third difference is that, as the modulated symbols of the UPI are mapped in the modified first step (I'), the previous fifth step (V) is unnecessary, and thus, there is no puncturing of the CSI part 2 or the UL-SCH.

In some implementations, if the HARQ-ACK is multiplexed in a PUSCH occasion, the UPI will also be multiplexed in the same PUSCH occasion regardless of the value of $O_{UPI}$. The UPI and the HARQ-ACK may be concatenated and jointly encoded. In such cases, there may be no reserved resource elements. The mapping of modulated symbols of the UPI, the UCI and the UL-SCH to the resource elements may follow the following the modified steps (I' to IV').

In the modified first step (I'), the modulated symbols of the concatenated UPI and HARQ-ACK are mapped to the $Q'_{UPI}$ resource elements that are determined in the same manner as that for the reserved resource elements, as described above, except that the $O_{UPI}$ is set to the total number of HARQ-ACK bits and UPI bits.

In the modified second step (II'), the modulated symbols of the CSI part 1 are mapped as described above. If a resource element is used for mapping the UPI and the HARQ-ACK, the resource element is not used for mapping the modulated symbol of the CSI part 1.

In the modified third step (III'), the modulated symbols of the CSI part 2 are mapped as described above. If a resource element is used for mapping the UPI and the HARQ-ACK, the resource element is not used for mapping the modulated symbol of the CSI part 2.

In the modified fourth step (IV'), the modulated symbols of the UL-SCH are mapped as described above. If a resource element is used for mapping the UPI and the HARQ-ACK, the resource element is not used for mapping the modulated symbol of the UL-SCH.

Figure 11:
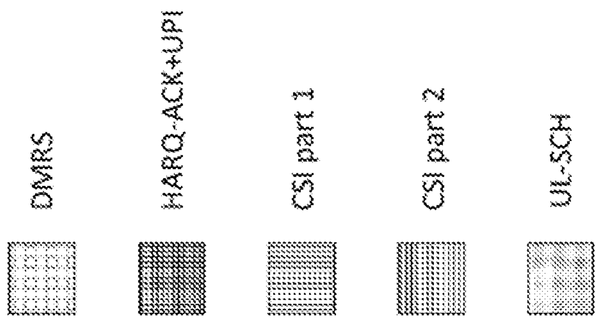
FIG. 11 is a diagram illustrating the mapping of resource elements and radio signals, according to an example implementation of the present disclosure.
Figure 11:
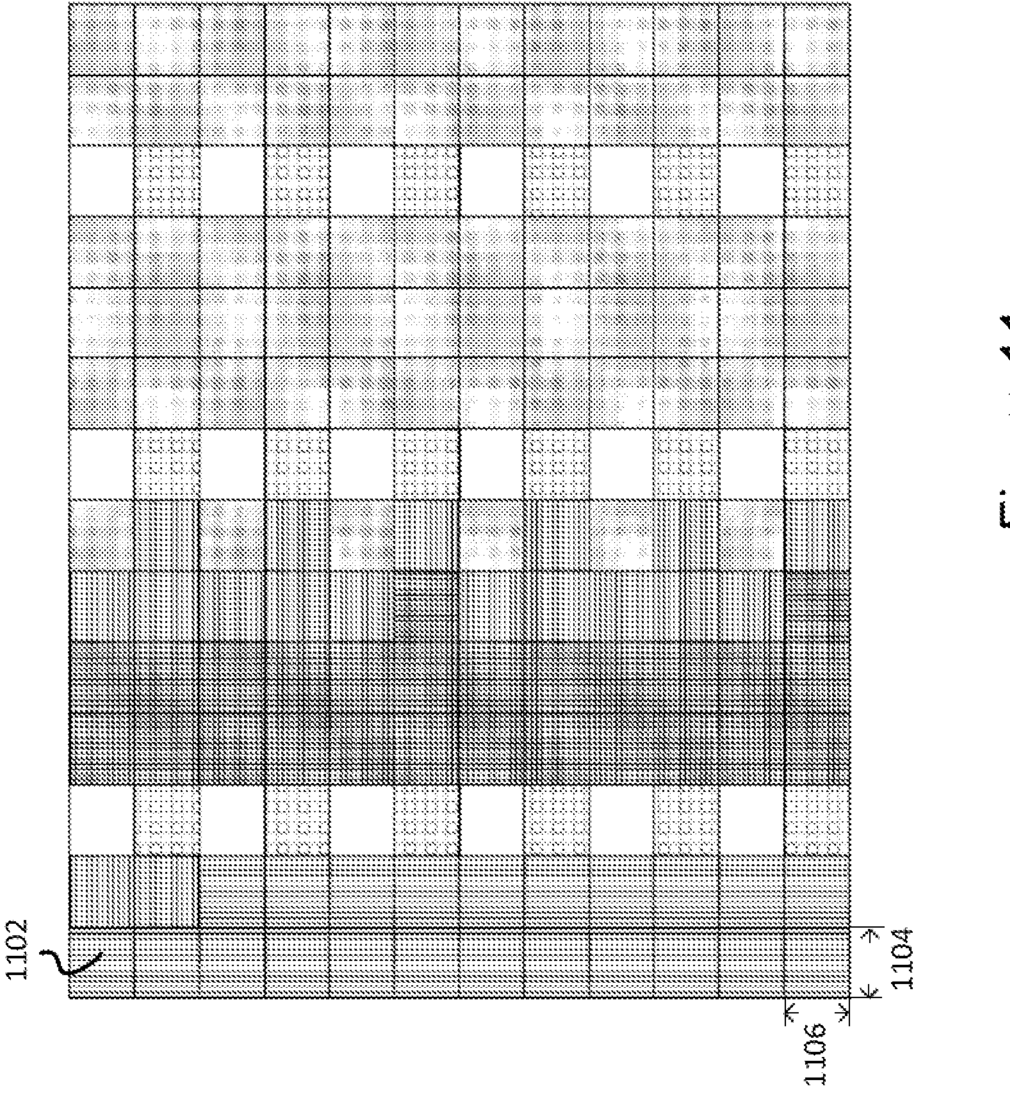

FIG. 11 is a diagram illustrating the mapping of resource elements and radio signals, according to an example implementation of the present disclosure. As illustrated in FIG. 11, each square 1102 represents one resource element. The horizontal width 1104 of each square 1102 corresponds to one symbol, while its vertical height 1106 denotes one subcarrier. Additionally, various shadings within the squares are utilized to distinguish their functions, such as for transmitting the concatenated and jointly encoded HARQ-ACK and UPI (denoted as "HARQ-ACK+UPI" in FIG. 11), the CSI part 1, the CSI part 2, or the UL-SCH.

In some implementations, the number of resource elements reserved for the HARQ-ACK and the UPI is $Q'_{UPI}$. For example, the value of $Q'_{UPI}$ may be determined as:

$$Q'_{UPI} = \min\left\{\left\lceil \frac{(O_{threshold} + L_{UPI}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right\rceil, \left\lceil \alpha \cdot \sum_{l=l_0}^{N_{symb,all}^{PUSCH}-1} M_{sc}^{UCI}(l) \right\rceil\right\},$$

where $O_{threshold}$ may be configured via RRC signaling.

If the HARQ-ACK is not multiplexed in a PUSCH occasion, the UPI may be mapped to a subset of the reserved resource elements. If the UPI is not multiplexed in a PUSCH occasion, the HARQ-ACK may be mapped to a subset of the reserved resource elements if $O_{HARQ-ACK}$ IS less than or equal to 2 bits.

If the HARQ-ACK and the UPI are multiplexed in a PUSCH occasion and $O_{HARQ-ACK}+O_{UPI}$ is less than $O_{threshold}$, the UPI and the HARQ-ACK may be concatenated and jointly encoded. The modulated symbols are mapped to a subset of the reserved resource elements. If the HARQ-ACK and UPI are multiplexed in a PUSCH occasion and $O_{HARQ-ACK}+O_{UPI}$ IS equal to $O_{threshold}$, the UPI and the HARQ-ACK may be concatenated and jointly encoded. The modulated symbols may be mapped to the reserved resource elements. If the HARQ-ACK and UPI are multiplexed in a PUSCH occasion and $O_{HARQ-ACK}+O_{UPI}$ is greater than $O_{threshold}$, no resource elements are reserved, and the mapping of the HARQ-ACK and the UPI may be performed by following the above-described steps (e.g., steps I to V or steps I' to IV').

In some implementations, if the UPI is determined to be multiplexed in a PUSCH occasion other than the first PUSCH occasion that is transmitted within a CG periodicity, $O_{UPI}$ bits of padding bits (e.g., 0's) may be concatenated and jointly encoded with the HARQ-ACK.

In some implementations, if the UPI is determined to be multiplexed in a PUSCH occasion within a CG periodicity and the MAC entity does not indicate the UPI to the physical layer, $O_{UPI}$ bits of padding bits (e.g., $O_{UPI}$ bits of padding bits of 0's, or the UPI multiplexed in another PUSCH occasion in the CG periodicity) may be concatenated and jointly encoded with the HARQ-ACK.

In some implementations, if UPIs are transmitted in multiple PUSCH occasions, and a PUSCH occasion is indicated as unused by a first UPI of the UPIs, the PUSCH occasion is indicated as unused by a second UPI of the UPIs, where the first UPI may be transmitted earlier than the second UPI.

In some implementations, If UPIs are transmitted in multiple PUSCH occasions, and a PUSCH occasion is indicated as used by a first UPI of the UPIs, the PUSCH occasion may be indicated as unused by a second UPI of the UPIs, where the first UPI may be transmitted earlier than the second UPI. In some implementations, when the UE has not received an SFI or a UL CI before transmitting the first UPI, the UE may indicate a PUSCH occasion as used. The SFI or the UL CI may be received after the first UPI is transmitted and the PUSCH occasion is determined as invalid based on the SFI or the UL CI. In some implementations, when the UE has not performed the LCP or the LCH-based prioritization before transmitting the first UPI, the UE may indicate a PUSCH occasion as used. The UE performed the LCP or the LCH-based prioritization after the first UPI is transmitted and the UL grant associated with the PUSCH occasion is determined as deprioritized or skipped.

To assist the gNB in reallocating the PUSCH resources of a PUSCH occasion indicated as unused, the UL grant associated with the PUSCH occasion may be determined as deprioritized when the logical channel-based prioritization is performed. In other words, the UL grant associated with the PUSCH occasion may be deprioritized regardless of the availability of data of any logical channel that could be multiplexed in the PUSCH occasion or the availability of data of any logical channel associated with other UL grants.

In some implementations, the number of used PUSCH occasions is determined by the MAC entity of the UE, based on the size of an (RLC) PDU set and the amount of data that can be contained in a PUSCH occasion. The amount of data that can be contained in a PUSCH occasion may be determined based on a TBS, e.g., TBS minus OH, where OH is a reference overhead accounting possible overhead in MAC layer, which may be configured via RRC signaling. For example, the number of used PUSCH occasions may be determined as $$\frac{PDU \text{ set size}}{TBS-OH}.$$

The size of the (RLC) PDU set may be determined as the sum of the available data from a specific LCH. If the application layer PDU set is mapped to multiple logical channels, the size of the (RLC) PDU set may be determined as the sum of the available data of multiple specific LCHs.

In some implementations, the UPI may be determined based on the number of used PUSCH occasions. For example, if there are 8 PUSCH occasions within a CG periodicity, the unused PUSCH occasions may be determined as the last 4 PUSCH occasions if the number of used PUSCH occasions is 4. In some implementations, the determination of the UPI may consider one or more of the following factors: (1) the PUSCH occasion for multiplexing the UPI and (2) the validity of PUSCH occasions. For example, if the first transmitted PUSCH occasion within a CG periodicity is the second PUSCH occasion in the CG periodicity and the number of used PUSCH occasions is 4, then the second, third, fourth, and fifth PUSCH occasions are used. As a result, the UPI may indicate the sixth, seventh, and eighth PUSCH occasions as unused. In such a case, if the UPI indicates the unused valid PUSCH occasions, a value of 2 may be indicated if any of the sixth, seventh, and eighth PUSCH occasions are invalid.

In some implementations, the determination of the UPI may be performed before the LCP or the LCH-based prioritization is performed for a subset of the PUSCH occasions. The LCP (procedure) may have been performed only for the PUSCH occasion in which the UPI is multiplexed, but not for other PUSCH occasions. The UPI may be determined by the MAC entity for the first transmitted PUSCH occasion within a CG periodicity. The first transmitted PUSCH occasion within a CG periodicity may or may not be the first PUSCH occasion in the CG periodicity. For example, if the first TB of a PDU set is built for transmission in the second PUSCH occasion in the CG periodicity, the UPI may be determined before transmission of the second PUSCH occasion in the CG periodicity so that the UPI can be multiplexed in the second PUSCH occasion. The UPI determined for the first transmitted PUSCH occasion may be indicated by the MAC entity to the physical layer for multiplexing in the first transmitted PUSCH occasion. If the UPI is determined to be multiplexed in a PUSCH occasion other than the first transmitted PUSCH occasion, the UPI determined for the first transmitted PUSCH occasion may be indicated by the MAC entity to the physical layer for multiplexing in the PUSCH occasion. If the UPI is determined to be multiplexed in a PUSCH occasion other than the first transmitted PUSCH occasion, the physical layer may multiplex in this PUSCH occasion the same UPI that is multiplexed in the first transmitted PUSCH occasion.

In some implementations, the UPI may be determined for each transmitted PUSCH occasions. If the UPI is determined to be multiplexed in a PUSCH occasion, the UPI determined for the PUSCH occasion is indicated by the MAC entity to the physical layer for multiplexing in the PUSCH occasion. The usage status of a PUSCH occasion (used or unused) may be indicated differently by UPIs transmitted in different PUSCH occasions.

In some implementations, the UPI may be determined by the physical layer of the UE. The MAC entity may provide information, such as the PDU set size and the OH to the physical layer. The physical layer may then use the information to determine the UPI. In some implementations, the information may be provided to the physical layer before the first transmitted PUSCH occasion or may be provided to the physical layer before each PUSCH occasion within a CG periodicity.

Figure 12:
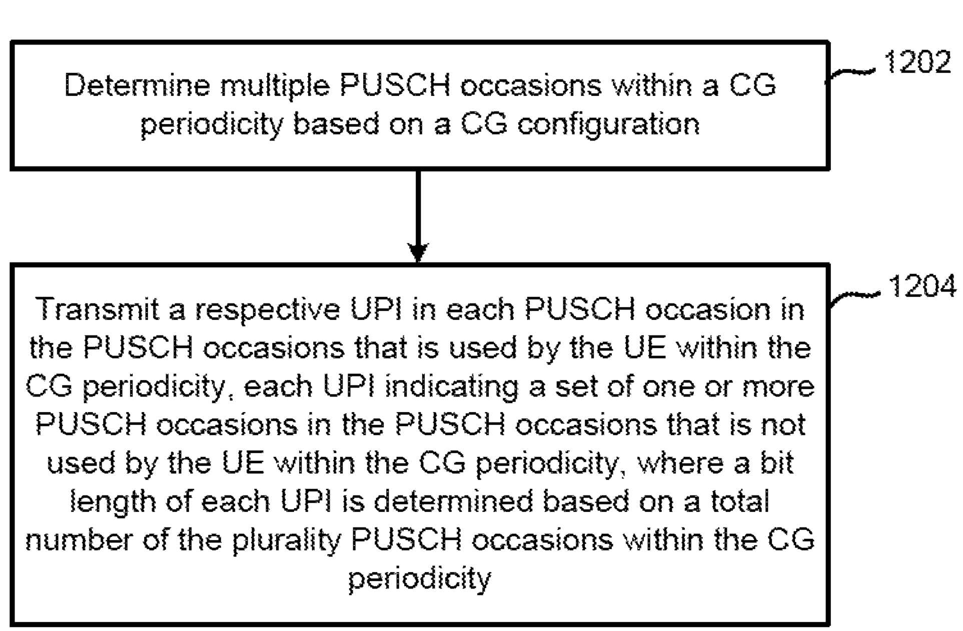
FIG. 12 is a flowchart of a method for reporting CG resource usage status, according to an example implementation of the present disclosure.

FIG. 12 is a flowchart of a method 1200 for reporting CG resource usage status, according to an example implementation of the present disclosure. It should be noted that although actions 1202 and 1204 are illustrated as separate actions represented as independent blocks in FIG. 12, these separately illustrated actions should not be construed as necessarily order-dependent. The order in which the actions are performed in FIG. 12 is not intended to be construed as a limitation, and any number of the disclosed blocks may be combined in any order to implement the method, or an alternate method. Moreover, each of actions 1202 and 1204 may be performed independently of other actions and may be omitted in some implementations of the present disclosure.

In action 1202, a UE may determine multiple PUSCH occasions within a CG periodicity based on a CG configuration.

In action 1204, the UE may transmit a respective UPI in each PUSCH occasion in the PUSCH occasions that is used by the UE within the CG periodicity. Each UPI may indicate a set of one or more PUSCH occasions in the plurality of PUSCH occasions that is not used by the UE within the CG periodicity. Additionally, a bit length of each UPI may be determined based on a total number of the plurality PUSCH occasions within the CG periodicity.

In some implementations, each UPI includes a bitmap, and each bit in the bitmap may correspond to a respective PUSCH occasion of the multiple PUSCH occasions within the CG periodicity.

In some implementations, the total number of bits in the bitmap may be equal to the total number of the plurality of PUSCH occasions within the CG periodicity.

In some implementations, each UPI may further indicate a second set of one or more PUSCH occasions in the plurality of PUSCH occasions that is scheduled to be used by the UE within the CG periodicity. For example, each UPI may indicate any PUSCH occasions scheduled to be used within the CG periodicity.

In some implementations, the multiple PUSCH occasions within the CG periodicity may include a first PUSCH occasion, a second PUSCH occasion, and a third PUSCH occasion. In such cases, the action of transmitting the respective UPI in each PUSCH occasion used by the UE within the CG periodicity may further include: (1) transmitting a first UPI in the first PUSCH occasion, the first UPI indicating that the third PUSCH occasion is scheduled to be used (by the UE), and (2) transmitting a second UPI in the second PUSCH occasion, which occurs after the first PUSCH occasion, the second UPI changing a usage status of the third PUSCH occasion by indicating that the third PUSCH is unused (e.g., not used by the UE).

In some implementations, transmitting the respective UPI may include transmitting each UPI via UCI. For example, each UPI may be transmitted via UCI.

In some implementations, the UCI may include HARQ-ACK information, and a transmission priority of the HARQ-ACK information may be configured to be greater than a transmission priority of each UPI.

Referring to FIG. 2 as an example, within the CG periodicity 210, the UE may transmit a UPI in the first PUSCH occasion 202 (used by the UE) to indicate that the second and third PUSCH occasions 204 and 206 within the CG periodicity 210 are unused. For example, the UPI may include a bitmap, with each bit corresponding to a respective PUSCH occasion within the CG periodicity 210. The bit length of the bitmap may be 3 bits in this example as there are three PUSCH occasions in total in a CG periodicity.

If a bit in the bitmap is set to a first value, this indicates that the corresponding PUSCH occasion is unused. If a bit in the bitmap is set to a second value, this indicates that the corresponding PUSCH occasion is scheduled to be used. The UE may not transmit a UPI in either the PUSCH occasion 204 or 206 within the CG periodicity 210, as these PUSCH occasions are determined as unused. Within the subsequent CG periodicity 220, where all PUSCH occasions are scheduled to be used, the UE may transmit a respective UPI in each of the PUSCH occasions 202, 204, and 206 within the CG periodicity 220, where each UPI may indicate that none of the PUSCH occasions within CG periodicity 220 are unused.

Figure 13:
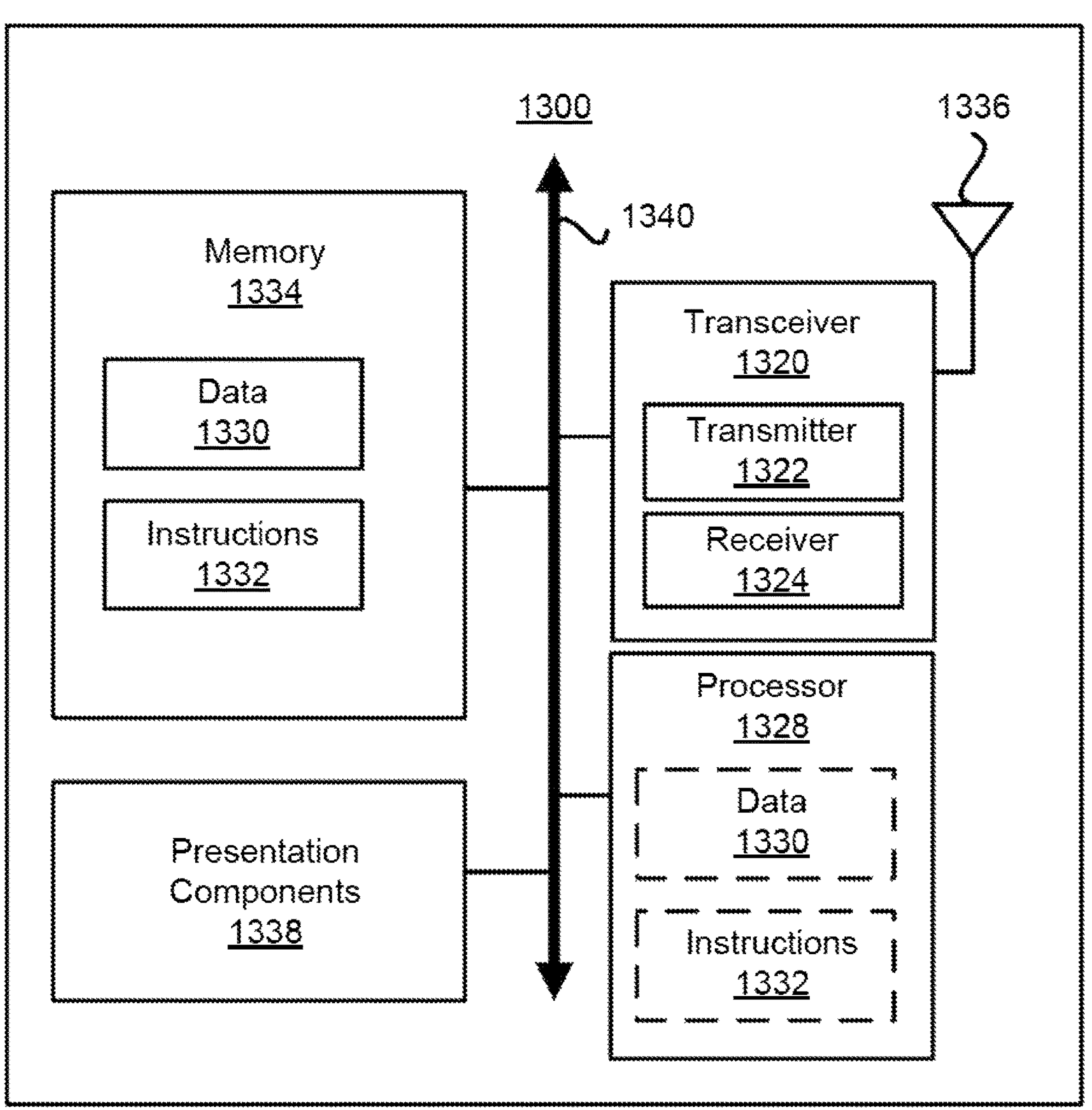
FIG. 13 is a block diagram illustrating a node for wireless communication, according to an example implementation of the present disclosure.

FIG. 13 is a block diagram illustrating node 1300 for wireless communication in accordance with various aspects of the present disclosure. As illustrated in FIG. 13, node 1300 may include transceiver 1320, processor 1328, memory 1334, one or more presentation components 1338, and at least one antenna 1336. Node 1300 may also include a radio frequency (RF) spectrum band module, a BS communications module, a network communications module, and a system communications management module, Input/Output (I/O) ports, I/O components, and a power supply (not illustrated in FIG. 13).

Each of the components may directly or indirectly communicate with each other over one or more buses 1340. Node 1300 may be a UE or a BS that performs various functions disclosed with reference to FIGS. 1 through 12.

Transceiver 1320 has transmitter 1322 (e.g., transmitting/transmission circuitry) and receiver 1324 (e.g., receiving/reception circuitry) and may be configured to transmit and/or receive time and/or frequency resource partitioning information. Transceiver 1320 may be configured to transmit in different types of subframes and slots including, but not limited to, usable, non-usable, and flexibly usable subframes and slot formats. Transceiver 1320 may be configured to receive data and control channels.

Node 1300 may include a variety of computer-readable media. Computer-readable media may be any available media that may be accessed by node 1300 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules, or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the above-listed components should also be included within the scope of computer-readable media.

Memory 1334 may include computer-storage media in the form of volatile and/or non-volatile memory. Memory 1334 may be removable, non-removable, or a combination thereof. Example memory may include solid-state memory, hard drives, optical-disc drives, etc. As illustrated in FIG. 13, memory 1334 may store a computer-readable and/or computer-executable instructions 1332 (e.g., software codes) that are configured to, when executed, cause processor 1328 to perform various functions disclosed herein, for example, with reference to FIGS. 1 through 12. Alternatively, instructions 1332 may not be directly executable by processor 1328 but may be configured to cause node 1300 (e.g., when compiled and executed) to perform various functions disclosed herein.

Processor 1328 (e.g., having processing circuitry) may include an intelligent hardware device, e.g., a Central Processing Unit (CPU), a microcontroller, an ASIC, etc. Processor 1328 may include memory. Processor 1328 may process data 1330 and instructions 1332 received from memory 1334, and information transmitted and received via transceiver 1320, the baseband communications module, and/or the network communications module. Processor 1328 may also process information to send to transceiver 1320 for transmission via antenna 1336 to the network communications module for transmission to a CN.

One or more presentation components 1338 may present data indications to a person or another device. Examples of presentation components 1338 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A method performed by a User Equipment (UE) for reporting Configured Grant (CG) resource usage status, the method comprising:

determining a plurality of Physical Uplink Shared Channel (PUSCH) occasions within a CG periodicity based on a CG configuration; and transmitting a respective Unused PUSCH Indicator (UPI) in each PUSCH occasion in the plurality of PUSCH occasions that is used by the UE within the CG periodicity, each UPI indicating a set of one or more PUSCH occasions in the plurality of PUSCH occasions that is not used by the UE within the CG periodicity, wherein:

a bit length of each UPI is determined based on a total number of the plurality of PUSCH occasions within the CG periodicity, and the set of one or more PUSCH occasions indicated as not used by each UPI includes only PUSCH occasions that are separated from an earliest PUSCH occasion of the plurality of PUSCH occasions within the CG periodicity by at least a time duration, the time duration corresponding to a processing time for a base station to process the respective UPI.

2. The method of claim 1, wherein each UPI comprises a bitmap, and each bit in the bitmap corresponds to a respective PUSCH occasion of the plurality of PUSCH occasions within the CG periodicity.

3. The method of claim 2, wherein a total number of bits in the bitmap is equal to the total number of the plurality of PUSCH occasions within the CG periodicity.

4. The method of claim 1, wherein each UPI further indicates a second set of one or more PUSCH occasions in the plurality of PUSCH occasions that is scheduled to be used by the UE within the CG periodicity.

5. The method of claim 4, wherein:

the plurality of PUSCH occasions within the CG periodicity comprises a first PUSCH occasion, a second PUSCH occasion, and a third PUSCH occasion, and transmitting the respective UPI in each PUSCH occasion of the plurality of PUSCH occasions that is used by the UE within the CG periodicity comprises:

transmitting a first UPI in the first PUSCH occasion, the first UPI indicating that the third PUSCH occasion is scheduled to be used; and transmitting a second UPI in the second PUSCH occasion, which occurs after the first PUSCH occasion, the second UPI changing a usage status of the third PUSCH occasion by indicating that the third PUSCH occasion is unused.

6. The method of claim 1, wherein transmitting the respective UPI comprises transmitting each UPI via Uplink Control Information (UCI).

7. The method of claim 6, wherein the UCI comprises Hybrid Automatic Repeat Request-Acknowledgment (HARQ-ACK) information, and a transmission priority of the HARQ-ACK information is configured to be greater than a transmission priority of each UPI.

8. A User Equipment (UE) for reporting Configured Grant (CG) resource usage status, the UE comprising:

at least one processor; and at least one memory coupled to the at least one processor, the at least one memory storing one or more computer-executable instructions that, when executed by the at least one processor, cause the UE to:

determine a plurality of Physical Uplink Shared Channel (PUSCH) occasions within a CG periodicity based on a CG configuration; and transmit a respective Unused PUSCH Indicator (UPI) in each PUSCH occasion in the plurality of PUSCH occasions that is used by the UE within the CG periodicity, each UPI indicating a set of one or more PUSCH occasions in the plurality of PUSCH occasions that is not used by the UE within the CG periodicity, wherein;

a bit length of each UPI is determined based on a total number of the plurality of PUSCH occasions within the CG periodicity, and the set of one or more PUSCH occasions indicated as not used by each UPI includes only PUSCH occasions that are separated from an earliest PUSCH occasion of the plurality of PUSCH occasions within the CG periodicity by at least a time duration, the time duration corresponding to a processing time for a base station to process the respective UPI.

9. The UE of claim 8, wherein each UPI comprises a bitmap, and each bit in the bitmap corresponds to a respective PUSCH occasion of the plurality of PUSCH occasions within the CG periodicity.

10. The UE of claim 9, wherein a total number of bits in the bitmap is equal to the total number of the plurality of PUSCH occasions within the CG periodicity.

11. The UE of claim 8, wherein each UPI further indicates a second set of one or more PUSCH occasions in the plurality of PUSCH occasions that is scheduled to be used by the UE within the CG periodicity.

12. The UE of claim 11, wherein:

the plurality of PUSCH occasions within the CG periodicity comprises a first PUSCH occasion, a second PUSCH occasion, and a third PUSCH occasion, and transmitting the respective UPI in each PUSCH occasion of the plurality of PUSCH occasions that is used by the UE within the CG periodicity comprises:

transmitting a first UPI in the first PUSCH occasion, the first UPI indicating that the third PUSCH occasion is scheduled to be used; and transmitting a second UPI in the second PUSCH occasion, which occurs after the first PUSCH occasion, the second UPI changing a usage status of the third PUSCH occasion by indicating that the third PUSCH occasion is unused.

13. The UE of claim 8, wherein transmitting the respective UPI comprises transmitting each UPI via Uplink Control Information (UCI).

14. The UE of claim 13, wherein the UCI comprises Hybrid Automatic Repeat Request-Acknowledgment (HARQ-ACK) information, and a transmission priority of the HARQ-ACK information is configured to be greater than a transmission priority of each UPI.

* * * * *